US012332830B2

(12) United States Patent
Lim et al.

(10) Patent No.: US 12,332,830 B2
(45) Date of Patent: Jun. 17, 2025

(54) STORAGE CONTROLLER AND STORAGE DEVICE FOR PCIe COMMUNICATION OPTIMIZATION

(71) Applicant: SAMSUNG ELECTRONICS CO., LTD., Suwon-si (KR)

(72) Inventors: Jae Hwan Lim, Suwon-si (KR); Hyun Jung Yoo, Suwon-si (KR); Byung Yo Lee, Suwon-si (KR); Walter Jun, Suwon-si (KR); Ji-Hoon Kim, Suwon-si (KR); Jung Woo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 13 days.

(21) Appl. No.: 18/304,839

(22) Filed: Apr. 21, 2023

(65) Prior Publication Data
US 2024/0020262 A1 Jan. 18, 2024

(30) Foreign Application Priority Data
Jul. 18, 2022 (KR) .......... 10-2022-0087929

(51) Int. Cl.
*G06F 13/42* (2006.01)
*G06F 3/06* (2006.01)
(52) U.S. Cl.
CPC ........ *G06F 13/4221* (2013.01); *G06F 3/0614* (2013.01); *G06F 3/0656* (2013.01);
(Continued)

(58) Field of Classification Search
CPC .. G06F 13/4221; G06F 3/0614; G06F 3/0656; G06F 3/0658; G06F 3/0673
See application file for complete search history.

(56) References Cited

U.S. PATENT DOCUMENTS 8,599,913 B1 12/2013 Brown et al.
9,424,226 B1 8/2016 Weimer
(Continued)

OTHER PUBLICATIONS

EP 1st Office Action Dated Dec. 15, 2023 In Corresponding EP 23 177 556.0.
(Continued)

*Primary Examiner* — David E Martinez
(74) *Attorney, Agent, or Firm* — MORGAN, LEWIS & BOCKIUS LLP

(57) ABSTRACT

A storage controller receives a first transmission preset value and a first coefficient value at a first time from outside, at a phase 3 stage of a PCIe link training and equalization, checks whether the first transmission preset value and the first coefficient value are optimal with reference to a database, transmits signals corresponding to the first transmission preset value and the first coefficient value to the outside when the first transmission preset value and the first coefficient value are determined to be optimal and transmits signals corresponding to a second transmission preset value and a second coefficient value from the database, which are different from the first transmission preset value and the first coefficient value and optimal for the phase 3 stage of the PCIe link training and equalization, to the outside when the first transmission preset value and the first coefficient value are determined not to be optimal.

20 Claims, 17 Drawing Sheets

(52) U.S. Cl.
CPC .......... *G06F 3/0658* (2013.01); *G06F 3/0673* (2013.01); *G06F 2213/0026* (2013.01)

(56) References Cited

U.S. PATENT DOCUMENTS

| | | |
|---|---|---|
| 9,645,965 B2 | 5/2017 | Das Sharma et al. |
| 10,880,137 B2 | 12/2020 | Das Sharma |
| 10,901,927 B2 | 1/2021 | Fischer et al. |
| 11,132,309 B2 | 9/2021 | Ryu |
| 2013/0051483 A1* | 2/2013 | Wyatt ............... H04L 25/03885 375/259 |
| 2014/0281067 A1* | 9/2014 | Das Sharma ....... G06F 13/4072 710/104 |
| 2020/0159584 A1 | 5/2020 | Cho et al. |
| 2020/0228375 A1 | 7/2020 | Chen et al. |
| 2021/0073154 A1 | 3/2021 | Li et al. |
| 2021/0390073 A1* | 12/2021 | Bito ................... H04L 25/0272 |

OTHER PUBLICATIONS

EP Search Report Dated Nov. 20, 2023 In Corresponding EP 23 177 556.0.

\* cited by examiner

FIG. 9

| PATH | PORT | LANE | SPEED | HIGH | LOW | RIGHT | PH3_PRECURSOR | PH3_POSTCURSOR |
|---|---|---|---|---|---|---|---|---|
| Rx | 5 | 0 | Gen3 | 101 | -106 | 79 | 1 | 0 |
| Rx | 5 | 1 | Gen3 | 101 | -99 | 74 | 1 | 0 |
| Rx | 5 | 2 | Gen3 | 94 | -99 | 69 | 1 | 0 |
| Rx | 5 | 3 | Gen3 | 98 | -98 | 76 | 2 | 0 |
| Rx | 5 | 0 | Gen3 | 103 | -106 | 81 | 1 | 0 |
| Rx | 5 | 1 | Gen3 | 99 | -105 | 69 | 1 | 0 |
| Rx | 5 | 2 | Gen3 | 97 | -105 | 71 | 1 | 0 |
| Rx | 5 | 3 | Gen3 | 96 | -100 | 78 | 2 | 0 |
| Rx | 5 | 0 | Gen3 | 99 | -106 | 77 | 1 | 0 |
| Rx | 5 | 1 | Gen3 | 98 | -102 | 76 | 1 | 0 |
| Rx | 5 | 2 | Gen3 | 99 | 102 | 70 | 1 | 0 |
| Rx | 5 | 3 | Gen3 | 96 | -96 | 79 | 2 | 0 |
| Rx | 5 | 0 | Gen3 | 78 | -79 | 50 | 3 | 4 |
| Rx | 5 | 1 | Gen3 | 99 | -104 | 72 | 1 | 0 |
| Rx | 5 | 2 | Gen3 | 94 | -101 | 74 | 1 | 0 |
| Rx | 5 | 3 | Gen3 | 93 | -97 | 80 | 2 | 0 |
| Rx | 5 | 0 | Gen3 | 81 | -82 | 56 | 3 | 4 |
| Rx | 5 | 1 | Gen3 | 95 | -104 | 70 | 1 | 0 |
| Rx | 5 | 2 | Gen3 | 98 | -99 | 72 | 1 | 0 |
| Rx | 5 | 3 | Gen3 | 95 | -98 | 80 | 2 | 0 |

STORAGE CONTROLLER AND STORAGE DEVICE FOR PCIe COMMUNICATION OPTIMIZATION

CROSS-REFERENCE TO RELATED APPLICATION

This U.S. non-provisional patent application claims priority under 35 U.S.C. 119 to Korean Patent Application No. 10-2022-0087929 filed on Jul. 18, 2022 in the Korean Intellectual Property Office, the disclosure of which is incorporated by reference in its entirety herein.

1. TECHNICAL FIELD

The present invention relates to a storage controller and a storage device including the same.

2. DISCUSSION OF RELATED ART

A storage device may include a non-volatile memory device and a storage controller that controls the non-volatile memory device. The non-volatile memory device includes a non-volatile memory that retains stored information even after power is removed. For example, the non-volatile memory could be flash memory, which can be electrically erased and reprogrammed.

The storage controller may communicate with an external host device on the basis of a defined communication protocol. With the development of related technologies, the rate at which the storage controller communicate with the external host device is gradually increasing. However, a communication between the storage controller communicates may become unreliable if the rate is too high.

SUMMARY

Aspects of the present invention provide a storage controller that increases communication reliability between a storage controller and an external host device.

Aspects of the present invention also provide a storage device including the storage controller that increases communication reliability between the storage controller and the external host device.

However, aspects of the present invention are not restricted to the one set forth herein. These and other aspects of the present invention will become more apparent to one of ordinary skill in the art to which the present invention pertains by referencing the detailed description of the present invention given below.

According to an aspect of the present inventive concept, there is provided a storage controller including, a link manager which includes a host request checker (e.g., a first logic circuit) that receives a first transmission preset value and a first coefficient value of a phase 3 stage at a first time from outside, at the phase 3 stage of a PCIe link training and equalization, and a database checker (e.g., a second logic circuit) that determines whether the first transmission preset value and the first coefficient value are optimal for the phase 3 stage of the PCIe link training and equalization, with reference to a database in which a plurality of transmission preset values and a plurality of coefficient values different from the first transmission preset value and the first coefficient value are recorded, prior to the first time, wherein when the first transmission preset value and the first coefficient value are determined to be optimal for the phase 3 stage of the PCIe link training and equalization, the database checker transmits a signal corresponding to the first transmission preset value and the first coefficient value to the outside, and when the first transmission preset value and the first coefficient value are determined not to be optimal for the phase 3 stage of the PCIe link training and equalization, the database checker transmits a signal corresponding to a second transmission preset value and a second coefficient value, which are different from the first transmission preset value and the first coefficient value and optimized for the phase 3 stage of the PCIe link training and equalization, to the outside.

According to an aspect of the present inventive concept, there is provided a storage device including, a storage controller, wherein the storage controller includes a link manager that includes a host request checker (e.g., a first logic circuit) which receives a first transmission preset value and a first coefficient value of a phase 3 stage at a first time from outside, at the phase 3 stage of a PCIe link training and equalization, and a database checker (e.g., a second logic circuit) which determines whether the first transmission preset value and the first coefficient value are optimal for the phase 3 stage of the PCIe link training and equalization, with reference to a database in which a plurality of transmission preset values and a plurality of coefficient values different from the first transmission preset value and the first coefficient value are recorded, prior to the first time, wherein when the first transmission preset value and the first coefficient value are determined to be optimal for the phase 3 stage of the PCIe link training and equalization, the database checker transmits a signal corresponding to the first transmission preset value and the first coefficient value to the outside, and when the first transmission preset value and the first coefficient value are determined not to be optimal for the phase 3 stage of the PCIe link training and equalization, the database checker transmits a signal corresponding to a second transmission preset value and a second coefficient value, which are different from the first transmission preset value and the first coefficient value and optimized for the phase 3 stage of the PCIe link training and equalization, to the outside.

According to an aspect of the present inventive concept, there is provided a storage system including, a host device, and a storage device which receives a first transmission preset value and a first coefficient value for a phase 3 stage at a first time from the host device, at the phase 3 stage of a PCIe link training and equalization, wherein the storage device includes a storage controller, the storage controller includes a link manager which includes a host request checker (e.g., a first logic circuit), and a database checker (e.g., a second logic circuit) which determines whether the first transmission preset value and the first coefficient value are optimal for the phase 3 stage of the PCIe link training and equalization, with reference to a database in which a plurality of transmission preset values and a plurality of coefficient values different from the first transmission preset value and the first coefficient value are recorded, prior to the first time point, wherein when the first transmission preset value and the first coefficient value are determined to be optimal for the phase 3 stage of the PCIe link training and equalization, the database checker transmits a signal corresponding to the first transmission preset value and the first coefficient value to the outside, and when the first transmission preset value and the first coefficient value are determined not to be optimal for the phase 3 stage of the PCIe link training and equalization, the database checker transmits a signal corresponding to a second transmission preset value and a second coefficient value, which are different from the first transmission preset value and the first coefficient value and optimal for the phase 3 stage of the PCIe link training and equalization, to the host device.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a diagram showing a database accessed by a link manager 215 of the storage system 10 of FIG. 1 according to an embodiment.

DETAILED DESCRIPTION OF THE EMBODIMENTS

Figure 1:
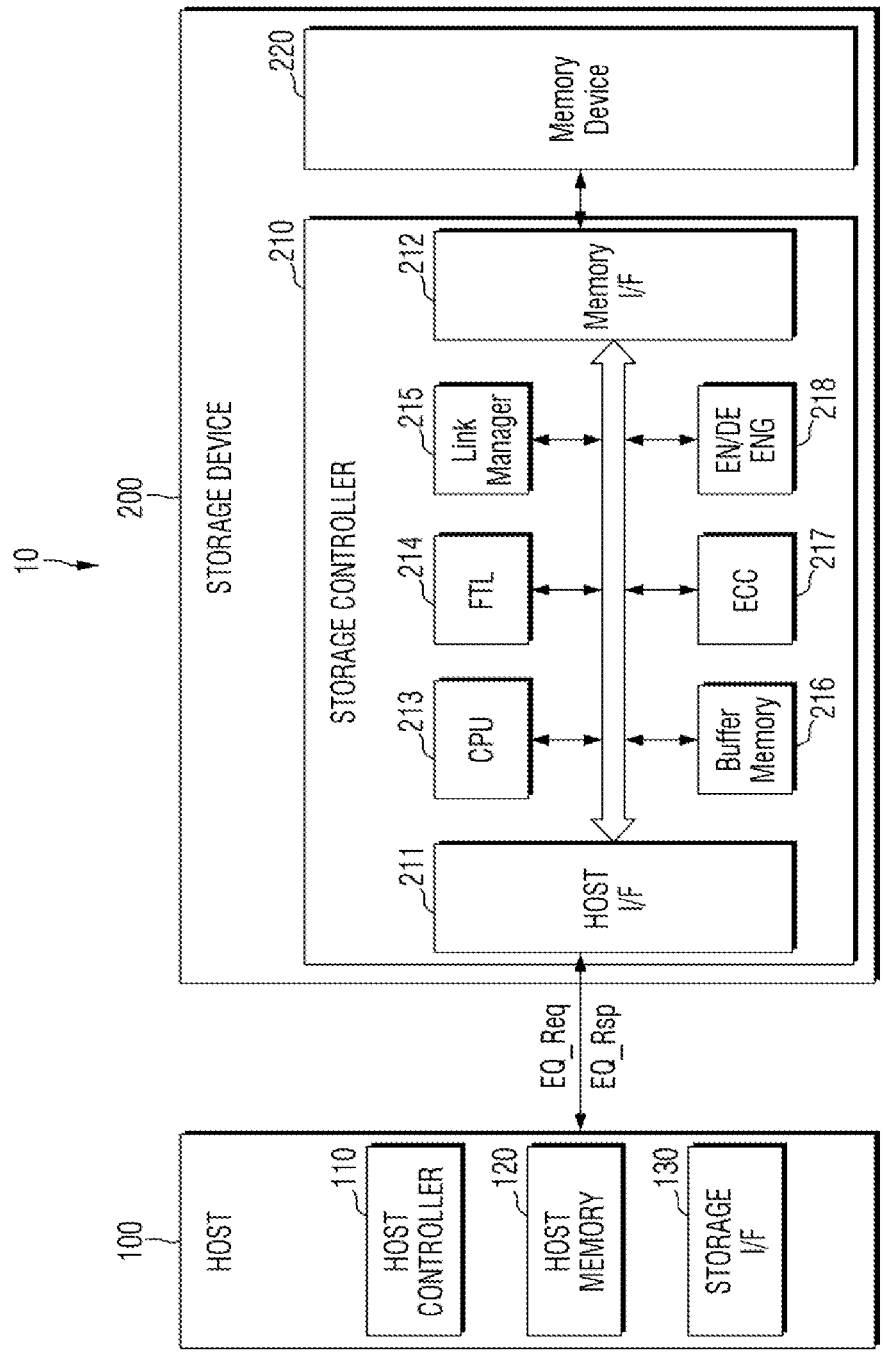
FIG. 1 is a block diagram showing a storage system 10 according to an embodiment.

Components described with reference to terms such as units, units, modules, blocks, ~or, ~er, or devices used in the detailed description and the functional blocks shown in the drawings may be implemented in the form of software, hardware or a combination thereof. For example, the software may be machine code, firmware, embedded code, and application software. For example, the hardware may include electrical circuits, electronic circuits, processors, computers, integrated circuits, integrated circuit cores, pressure sensors, inertial sensors, microelectromechanical system (MEMS), passive elements, or combinations thereof.

FIG. 1 is a block diagram showing a storage system 10 according to an embodiment.

The host-storage system 10 includes a host device 100 and a storage device 200. The storage device 200 includes a storage controller 210 (e.g., a control circuit) and a non-volatile memory (NVM) device 220. Further, according to an exemplary embodiment of the invention, the host device 100 may include a host controller 110 (e.g., a control circuit), a host memory 120, and a storage interface circuit 130. The host memory 120 may function as a buffer memory for temporarily storing the data to be transmitted to the storage device 200 or the data received from the storage device 200.

The storage device 200 may include a storage medium for storing the data in response to a request from the host device 100. As an example, the storage device 200 may include at least one of a Solid State Drive (SSD), an embedded memory, and a detachable external memory. When the storage device 200 is the SSD, the storage device 200 may be a device that complies with a non-volatile memory express (NVMe) standard. When the storage device 200 is an embedded memory or an external memory, the storage device 200 may be a device that complies with a universal flash storage (UFS) or an embedded multi-media card (eMMC) standard. The host device 100 and the storage device 200 may each generate and transmit packets according to the adopted standard protocol.

When the non-volatile memory device 220 of the storage device 200 includes a flash memory, the flash memory may include a two-dimensional (2D) NAND memory array or a 3D (or vertical) NAND (VNAND) memory array. As another example, the storage device 200 may include different various types of non-volatile memories. For example, a Magnetic RAM (MRAM), a spin-transfer torque MRAM, a conductive bridging RAM (CBRAM), a Ferroelectric RAM (ReRAM), a Phase RAM (PRAM), a resistive memory (Resistive RAM), and various other types of memories may be adopted as the storage device 200.

According to an embodiment, the host controller 110 and the host memory 120 may be implemented as separate semiconductor chips. Further, in some embodiments, the host controller 110 and the host memory 120 may be integrated on the same semiconductor chip. As an example, the host controller 110 may be any one of a plurality of modules provided in the application processor, and the application processor may be implemented as a system on chip (SoC). Further, the host memory 120 may be an embedded memory located inside the application processor, or a non-volatile memory or a memory module located outside the application processor.

The host controller 110 may manage an operation of storing data (e.g., write data) of a buffer region of the host memory 120 in the nonvolatile memory device 220 or storing data (e.g., read data) of the nonvolatile memory device 220 in the buffer region. For example, the host controller 110 may manage writing data to the nonvolatile memory device 220 or reading data from the nonvolatile memory device 220.

The storage interface circuit 130 may perform data communication between the host device 100 and the storage device 200 according to the communication protocol. The communication protocol may be the PCIe standard.

In the following description, the description will be made on the assumption that data is transmitted and received between the host device 100 and the storage device 200 through the PCIe standard.

For example, the host device 100 may transmit link training and equalization request values EQ_Req to the storage device 200 at a phase 3 stage of the PCIe link training and equalization.

The storage device 200 according to an embodiment checks whether the link training and equalization request values EC_Req requested by the host device 100 are values optimized at the phase 3 stage of the PCIe link training and equalization through the link manager 215, and then, transmits a signal EQ_Rsp corresponding to the link training and equalization request values EQ_Req requested by the host device 100 to the host device 100. For example, the link manager 215 determines whether the equalization request values EC_Req are optimal for the phase 3 stage of the PCIe link training and equalization.

The storage device 200 according to an embodiment transmits the signal EQ_Rsp corresponding to optimized values different from the link training and equalization request values EQ_Req requested by the host device 100 to the host device 100, when it has determined that the link training and equalization request values EC_Req requested by the host device 100 are not values optimized at the phase 3 stage of the PCIe link training and equalization through the link manager 215.

The link manager 215 may be implemented by an Embedded Field Programmable Gate Array (eFPGA) or a logic circuit.

A description of the link manager 215 will be provided below through FIGS. 10 to 16.

The storage controller 210 may include a host interface circuit 211, a memory interface 212, and a central processing unit (CPU) 213. Also, the storage controller 210 may further include a flash translation layer (FTL) 214, a link manager 215, a buffer memory 216, an error correction code (ECC) 217 engine, and an encryption/decryption engine 218. The storage controller 210 may further include a working memory (not shown) into which the flash translation layer (FTL) 214 is loaded, and when the CPU 213 executes the flash translation layer 214, the data write and read operations on the non-volatile memory device 220 may be controlled.

The host interface circuit 211 may transmit and receive packets to and from the host device 100. The packets transmitted from the host device 100 to the host interface circuit 211 may include a command, data to be written in the non-volatile memory device 220, or the like. The packets transmitted from the host interface circuit 211 to the host device 100 may include a response to the command, data that is read from the non-volatile memory device 220, and the like. The memory interface 212 may transmit the data to be written in the non-volatile memory device 220 to the non-volatile memory device 220 or receive the data that is read from the non-volatile memory device 220. The memory interface 212 may be implemented to comply with standard protocols such as Toggle or Open NAND Flash Interface (ONFI).

The flash translation layer 214 may perform various functions such as address mapping, wear-leveling, and garbage collection. The address mapping operation is an operation of changing a logical address received from the host device 100 into a physical address which is used for actually storing the data in the non-volatile memory device 220. The wear-leveling is a technique for ensuring that blocks in the non-volatile memory device 220 are used uniformly to prevent an excessive degradation of a particular block, and may be implemented, for example, through a firmware technique for balancing the erasure counts of the physical blocks. The garbage collection is a technique for ensuring an available capacity in the non-volatile memory device 220 through a method of copying valid data of one or more existing blocks to a new block and then erasing the existing block(s).

The link manager 215 may perform an operation for increasing reliability of the phase 3 stage of the PCIe link training and equalization between the storage device 200 including the storage controller 210 and the host device 100, as will be described below with reference to FIGS. 10 to 16.

For example, the link manager 215 may determine a case where the host controller 110 makes a request for optimal transmission preset values (Tx preset value) and coefficient values that cannot be trusted by the host controller 110 to the storage controller 210 at the phase 3 stage of the PCIe link training and equalization, and transmit signals for other optimal transmission preset values (Tx preset value) and coefficient values to the host controller 110.

A detailed description thereof will be given below with reference to FIGS. 10 to 16.

Further, the buffer memory 216 may also temporarily store data to be written to or read from the non-volatile memory device 220. Although the buffer memory 216 may be configured to be located inside the storage controller 210, in an alternate embodiment it may be located outside the storage controller 210.

The ECC engine 217 may perform error detection and correction functions on the read data that is read from the non-volatile memory device 220. More specifically, the ECC engine 217 may generate parity bits for the write data to be written to the non-volatile memory device 220, and the parity bits thus generated may be stored in the non-volatile memory device 220 together with the write data. When reading the data from the non-volatile memory device 220, the ECC engine 217 may correct errors of the read data, using the parity bits that are read from the non-volatile memory device 220, together with the read data, and may output the read data with corrected errors.

The encryption/decryption engine 218 may perform at least one of an encryption operation and a decryption operation on the data which is input to the storage controller 210.

For example, the encryption/decryption engine 218 may perform encryption and/or decryption operations using a symmetric key algorithm. For example, the encryption/decryption engine 218 may perform the encryption and/or decryption operation using an Advanced Encryption Standard (AES) algorithm or a Data Encryption Standard (DES) algorithm.

Further, for example, the encryption/decryption engine 218 may perform the encryption and/or decryption operations, using a public key encryption algorithm. For example, the encryption/decryption engine 218 may perform the encryption using the public key at the time of the encryption operation, and may perform the decryption using the private key at the time of the decryption operation. For example, the encryption/decryption engine 218 may utilize encryption algorithms such as Rivest Shamir Adleman (RSA), ECC (Elliptic Curve Cryptography (ECC), or Diffie-Hellman (DH).

The encryption/decryption engine 218 may perform the encryption and/or decryption operations, using quantum cryptography techniques such as Homomorphic Encryption (HE), Post-Quantum Cryptography (PQC) or Functional Encryption (FE), without being limited thereto.

Figure 2:
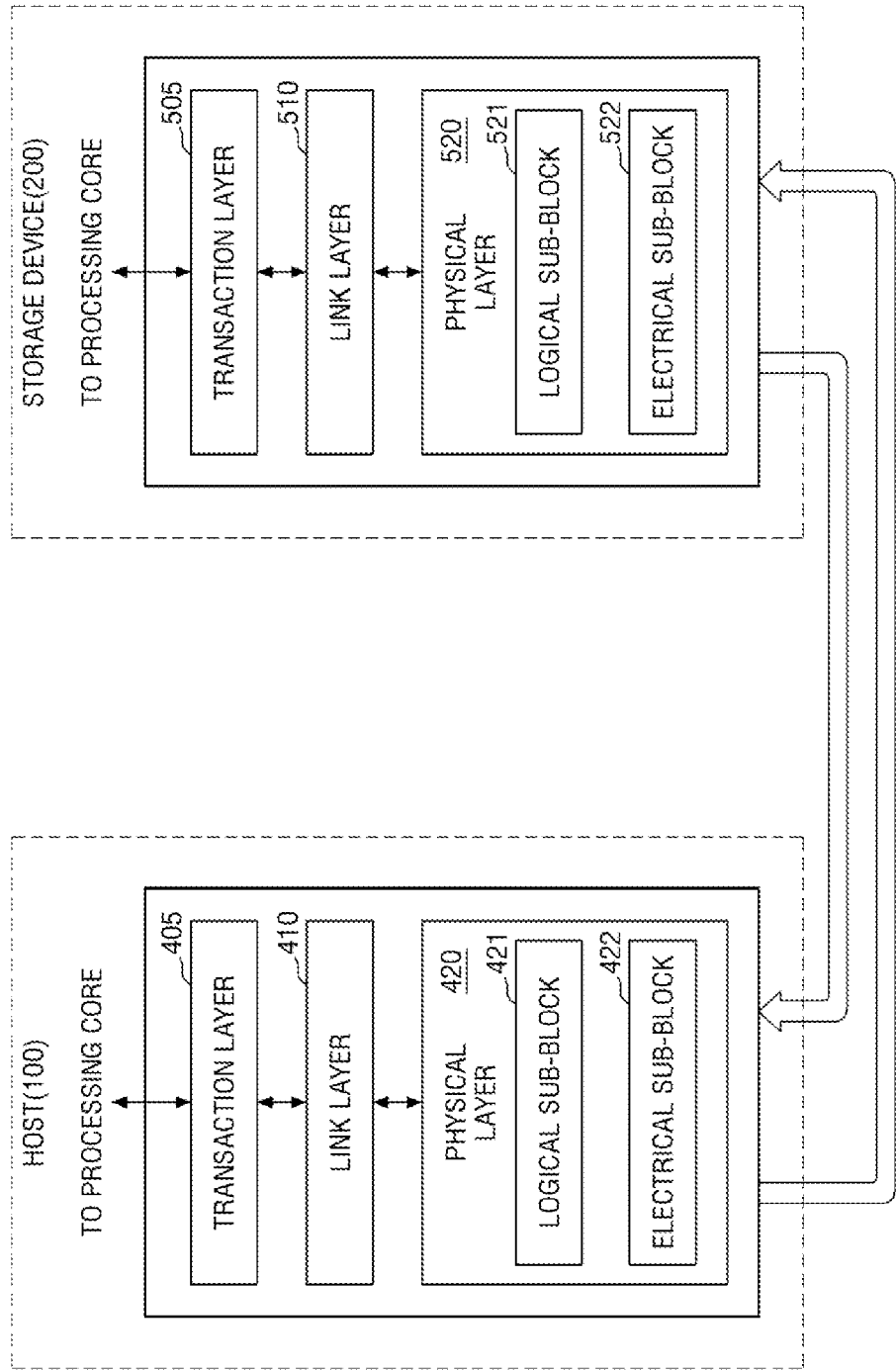
FIG. 2 is a block diagram showing the storage system 10 of FIG. 1 according to an embodiment.

FIG. 2 is a block diagram showing the storage system 10 of FIG. 1 according to an embodiment.

Referring to FIGS. 1 and 2, each of the host device 100 and the storage device 200 may form, for example, a layered protocol stack according to the PCIe standard.

The host device 100 includes a translation layer 405, a link layer 410, and a physical layer 420.

The storage interface circuit 130 included in the host device 100 of FIG. 1 may be formed by, for example, a layered protocol stack according to the PCIe standard of FIG. 2.

The storage device 200 also includes a translation layer 505, a link layer 510 and a physical layer 520.

The host interface circuit 211 included in the storage device 200 of FIG. 2 may be formed by, for example, a layered protocol stack according to the PCIe standard of FIG. 2. Components that communicate according to the PCIe standard (e.g., the host device 100 and/or the storage device 200) may utilize packets to send and receive information.

The packets are formed in the translation layers 405 and 505 and the link layers 410 and 510, and may be transmitted from the transmitting component (e.g., the host device 100 or the storage device 200) to the receiving component (e.g., the storage device 200 or the host device 100).

For the sake of convenience, an example in which packets are transmitted from the host device 100 to the storage device 200 will be described below.

That is, the packets are formed in the translation layer 405 and the link layer 410 and transmitted from the host device 100 to the storage device 200.

While the packets transmitted from the translation layer 405 of the host device 100 pass through other layers, the information necessary for controlling the packets may be added in each of the other layers to further extend the packets.

The storage device 200 performs translation on the packets received from the host device 100 so that they may be interpreted by the physical layer 520 and the link layer 510, and the translated packets may be processed in the translation layer 505.

The translation layers 405 and 505 may serve as an interface between the core for controlling each component and the link layers 410 and 510.

For example, the translation layer 405 may serve as an interface between cores in the host controller 110 that controls the host device 100 and the link layer 410.

Further, for example, the translation layer 505 may serve as an interface between a core (e.g., CPU 213) inside the storage controller 210 that controls the storage device 200 and the link layer 510.

That is, the translation layers 405 and 505 may serve to assemble or disassemble the packets (e.g., Translation Layer Packets (TLPs)).

The link layers 410 and 510 may serve as a medium between the translation layers 405 and 505 and the physical layers 420 and 520.

More specifically, the link layers 410 and 510 may apply a reliable mechanism to the translation layer packets that may be exchanged between the translation layers 405 and 505 and the physical layers 420 and 520.

For example, the link layer 410 receives translation layer packets assembled through the translation layer 405. For the translation layer packets received through the translation layer 405, the link layer 410 may apply a packet sequence identifier (e.g., an identification number or packet number) to the translation layer packets. After that, the link layer 410 may apply and compute an error detection code (e.g., a cyclic redundancy checking (CRC)) to the translation layer packets to which the packet sequence identifier is applied to generate modified translation layer packets. After that, the link layer 410 transmits the modified translation layer packets to the physical layer 420, and the physical layer 420 transmits the packets received from the link layer 410 to the external device (e.g., the storage device 200).

In another example, the link layer 510 receives assembled translation layer packets through the translation layer 505. For the translation layer packets received through the translation layer 505, the link layer 510 may apply the packet sequence identifier (e.g., an identification number or packet number) to the translation layer packets. The link layer 510 may then apply and compute an error detection code (e.g., a cyclic redundancy checking (CRC)) to the translation layer packets to which the packet sequence identifier is applied. The link layer 510 then transmits the modified translation layer packet to the physical layer 520, and the physical layer 520 transmits the packets received from the link layer 510 to an external device (e.g., the host device 100).

The physical layer 420 of the host device 100 includes a logical sub-block 421 and an electrical sub-block 422. The physical layer 520 of the storage device 200 includes a logical sub-block 521 and an electrical sub-block 522.

The logical sub-blocks 421 and 521 may play a role of enabling the physical layers 420 and 520 to perform digital functions.

More specifically, the logic sub-blocks 421 and 521 may include transmitters that prepare the information emitted by the electrical sub-blocks 422 and 522. In addition, the logic sub-blocks 421 and 521 may include a receiver that identifies information received from the external device and prepares for delivering it to the link layers 410 and 510, before delivering the information received from the external device to the link layer 410 and 510.

For example, the logical sub-block 421 prepares information emitted to an external device (e.g., the storage device 200) by the electrical sub-block 422, identifies information received from the external device (e.g., the storage device 200), and may prepare for delivering the information to the link layers 410 and 510.

In another example, the logic sub-block 521 prepares information emitted to an external device (e.g., the host device 100) by the electrical sub-block 522, identifies information received from the external device (e.g., the host device 100), and may prepare for delivering the information to the link layer 510.

A process of establishing the link (e.g., LTSSM (Link Training and Status State Machine)) may be performed to transmit and receive packets between the host device 100 and the storage device 200.

To transmit and receive packets between the host device 100 and the storage device 200, the process of establishing the link (e.g., LTSSM (Link Training and Status State Machine)) may be performed between the physical layers 420 and 520, more specifically, between the logical sub-blocks 421 and 521.

The process of establishing the link for transmitting and receiving the packets between the host device 100 and the storage device 200 will be described in detail with reference to FIG. 3.

Figure 3:
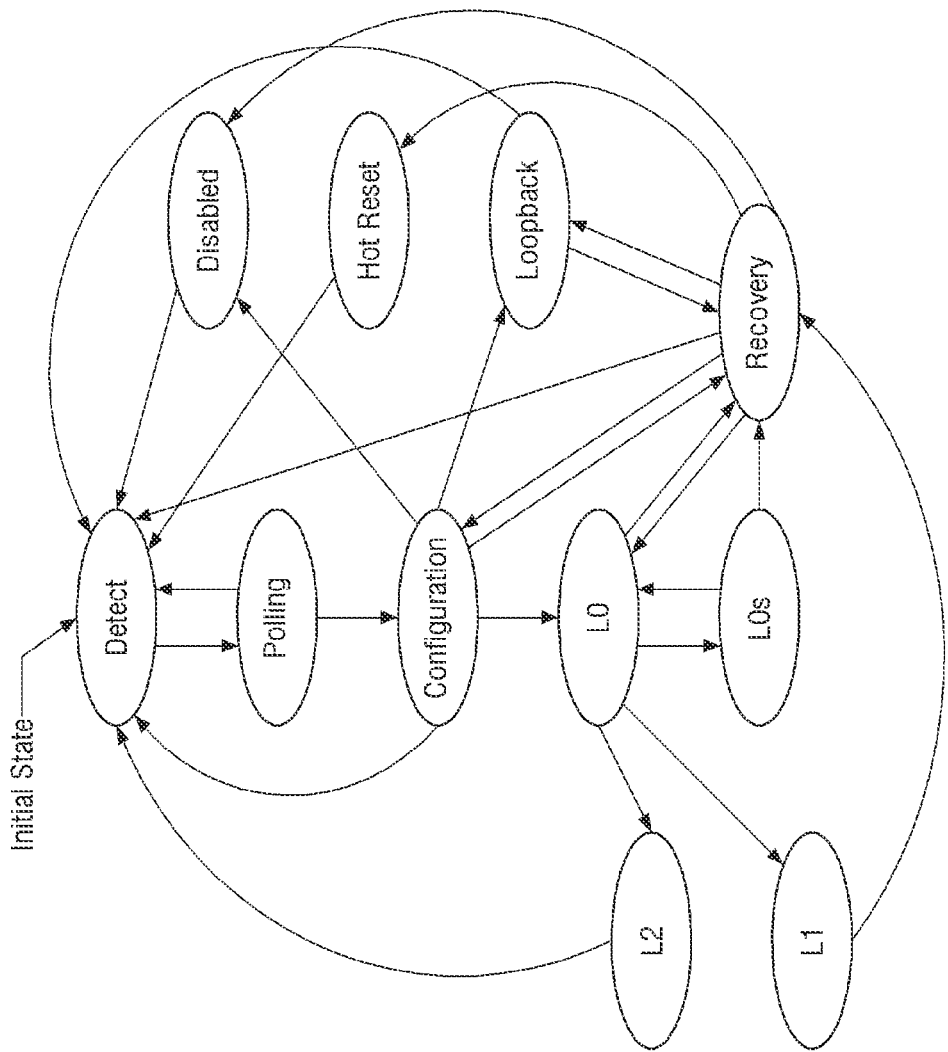
FIG. 3 is a diagram showing a process of establishing a link performed in a logical sub-block 521 inside a physical layer 520 of a storage device 200 of FIG. 1 according to some embodiments.

FIG. 3 is a diagram showing the process of establishing the link performed in the logical sub-block 521 inside the physical layer 520 of the storage device 200 of FIG. 1 according to an embodiment.

Referring to FIGS. 1 and 3, the process of establishing a link between the storage device 200 and the host device 100 is shown. Referring to FIGS. 1 and 3, an initial state may be a detection state (Detect). In the detection state, when the connection of another device (for example, the host device 100) is detected, the storage device 200 may enter a polling state.

In the polling state, a generation version of protocol (e.g., PCIe) of the host device 100 and a generation version of protocol (e.g., PCIe) of the storage device 200 are confirmed, and a data transmission rate may be determined on the basis of the highest generation version compatible with each other. Also, in the polling state, the storage controller 210 may set a bit lock, a symbol lock, a block lock, and a lane polarity. In the polling state, the storage controller 210 may transmit TS1 and TS2 which are ordered sets at a transmission rate of 2.5 giga-transfers per second (GT/s). For example, the storage controller 210 may transmit a message including TS1 and TS2.

After the polling state, the storage device 200 may enter a configuration state. In the configuration state, the storage controller 210 may set the number of lanes of the link, i.e., a link width. Also, in the configuration state, the storage controller 210 may exchange TS1 and TS2 with the host device 100 at a transmission rate of 2.5 GT/s. The storage controller 210 may assign the lane numbers, and confirm and calibrate the lane reversal. The storage controller 210 may deskew a lane-to-lane timing difference.

After the configuration state, the storage controller 210 may enter a L0 state. The L0 state may be a normal state. In the L0 state, the storage controller 210 may communicate with the host device 100 through the link.

An L0s state may be an Active State Power Management (ASPM) state. The storage controller 210 may reduce power consumption in the L0s state, until the storage controller 210 enters the L0 state. A L1 state may be a power saving state that consumes less power than the L0s state. A L2 state may use low voltages that are low enough to detect a wake-up event.

A disabled state may be entered when the storage controller 210 deactivates the link. A loopback state may be used by the storage controller 210 for testing and decoupling. A hot reset state may be used when the storage controller 210 resets the link through in-band signaling.

A recovery state may be used by the storage controller 210 to adjust the data transmission rate. For example, in the recovery state, the storage controller 210 may adjust the frequency distribution factors of a clock distributor of the host device 100 and a clock distributor of the storage device 200.

As an example, the storage controller 210 may adjust a clock distribution factor of the host device 100 and the storage device 200, by setting the dynamic link control bit of a link control register in the L0 state and requesting a retrain.

When the retrain is requested, the storage controller 210 may enter the recovery state to adjust the clock distribution factors of the host device 100 and the storage device 200. The storage controller 210 may then return to the L0 state, return to the configuration state, or return to the detection state. Alternatively, the storage controller 210 may return to the detection state through the hot reset state.

Figure 4:
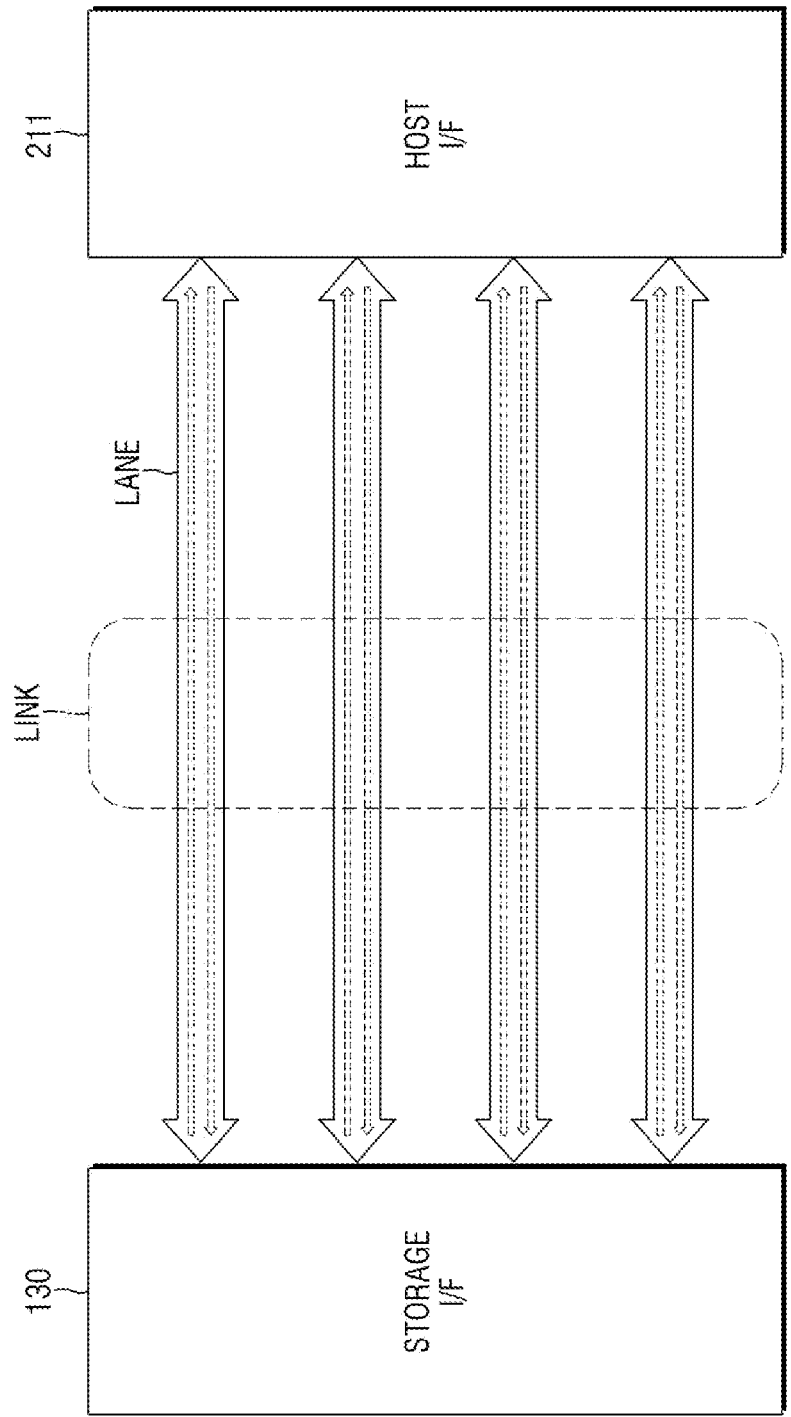
FIG. 4 is a diagram that shows an example of a link established between an interface circuit 130 of a host device 100 of the storage system 10 of FIG. 1 and a host interface circuit 211 of the storage device 200, according to an embodiment.

FIG. 4 is a diagram that shows an example of a link established between the interface circuit 130 of the host device 100 of the storage system 10 of FIG. 1 and the host interface circuit 211 of the storage device 200, according to an embodiment.

Referring to FIGS. 1 and 4, an example of a link established between the interface circuit 130 of the host device 100 and the host interface circuit 211 of the storage device 200 is shown. The link may include at least one lane.

For example, a link may include lanes corresponding to a number selected among numbers including 1, 2, 4, 8, and 16. As an example, it is assumed that the link includes four lanes. The lanes may transmit and receive signals at the same time. The lanes may correspond to parallel signal lines. The lanes may be configured to have the same link rate.

The data transmission rate of the link is determined by the number of lanes included in the link, that is, the product of the link width and the link rate of each lane. The storage device 200 according to the embodiment of the present invention may adjust the link width, i.e., the number of lanes included in the link, to adjust the data transmission rate of the link.

Each lane may include a transmission channel and a reception channel. The transmission channel of the host interface circuit 211 may correspond to a dashed arrow from the host interface circuit 211 to the interface circuit 130. The reception channel of the host interface circuit 211 may correspond to a dashed arrow pointing from the interface circuit 130 to the host interface circuit 211. Each of the transmission channel and reception channel may include complementary signal lines.

In an embodiment, the link training and equalization are performed between the interface circuit 130 of the host device 100 and the host interface circuit 211 of the storage device 200 during the recovery state described in FIG. 3.

In the PCIe standard, the link training and equalization may be performed through a total of 4 phase stages.

Four phase stages at which the link training and equalization are performed between the interface circuit 130 of the host device 100 and the host interface circuit 211 of the storage device 200 will be described with reference to FIGS. 5 to 8 below.

Figure 5:
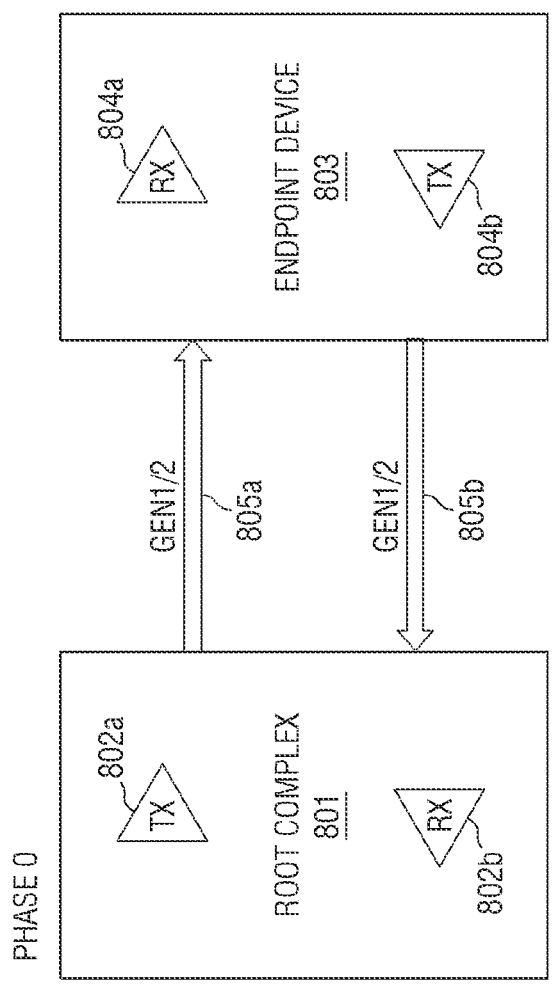
FIG. 5 is a diagram for explaining a phase 0 stage of equalization that operates in a recovery state of FIG. 3.

FIG. 5 is a diagram for explaining a phase 0 stage of equalization that operates in the recovery state of FIG. 3.

Referring to FIGS. 1 and 5, the phase 0 stage of the PCIe link training and equalization is shown.

Two different components, more specifically, a root complex device 801 and an endpoint device 803 may be connected by different communication link pairs 805a and 805b from each other.

For example, the root complex device 801 may be a device included in the storage interface circuit 130 of the host device 100 of FIG. 1. Also, the endpoint device 803 may be a device included in the host interface circuit 211 of the storage device 200 of FIG. 1.

The root complex device 801 includes a transmission logic circuit 802a and a reception logic circuit 802b. The endpoint device 803 includes a transmission logic circuit 804b and a reception logic circuit 804a. The transmission logic circuit 802a communicates with the reception logic circuit 804a. The transmission logic circuit 804b communicates with the reception logic circuit 802b.

In an embodiment, the root complex device 801 include a downstream port described in the PCIe standard. Further, in an embodiment, the endpoint device 803 includes an upstream port described in the PCIe standard.

At the phase 0 stage of the PCIe link training and equalization, first data sets (e.g., EQ TS2 ordered sets described in the PCIe standard) may be transmitted from a downstream port (e.g., the root complex device 801) to an upstream port (e.g., the endpoint device 803).

The rate at which the first data sets are transmitted at the phase 0 stage of the PCIe link training and equalization may be smaller than or equal to a first maximum data transmission rate associated with the root complex device 801 and a second maximum data transmission rate associated with the endpoint device 803.

A rate at which data is transmitted at the phase 0 stage of the PCIe link training and equalization according to an embodiments has a maximum PCIe Gen 1 or PCIe Gen 2 rate.

Figure 6:
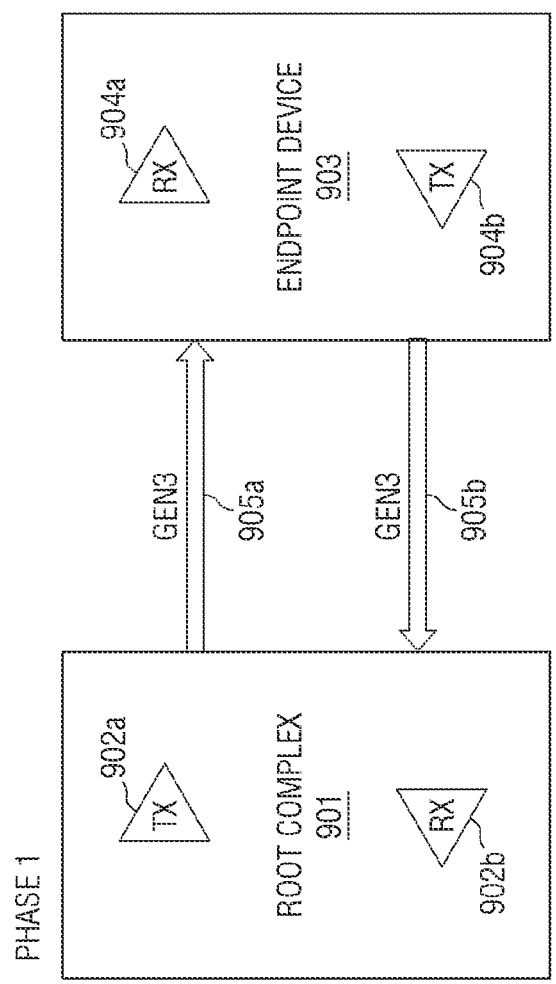
FIG. 6 is a diagram for explaining a phase 1 stage of equalization that operates in the recovery state of FIG. 3.

FIG. 6 is a diagram for explaining phase 1 stage of equalization that operates in the recovery state of FIG. 3.

Referring to FIGS. 1 and 6, the phase 1 stage of the PCIe link training and equalization is shown.

Two different components, more specifically, a root complex device 901 and an endpoint device 903, may be connected by different communication link pairs 905a and 905b from each other.

For example, the root complex device 901 may be a device included in the storage interface circuit 130 of the host device 100 of FIG. 1. Also, the endpoint device 903 may be a device included in the host interface circuit 211 of the storage device 200 of FIG. 1.

Each of the root complex device 901 and the endpoint device 903 includes transmission logic circuits 902a and 904b, and includes reception logic circuits 904a and 902b for communication therebetween.

In an embodiment, the root complex device 901 includes a downstream port described in the PCIe standard. Additionally, in an embodiment, the endpoint device 903 includes an upstream port described in the PCIe standard.

At the phase 1 stage of the PCIe link training and equalization, second data sets (e.g., TS1 ordered sets described in the PCIe standard) may be transmitted from a downstream port (e.g., the root complex device 901) to an upstream port (e.g., the endpoint device 903).

The rate at which the second data sets are transmitted at the phase 1 stage of the PCIe link training and equalization may be greater than the rate at which data is transmitted at the phase 0 stage of the PCIe link training and equalization.

For example, the rate at which data is transmitted at the phase 1 stage of the PCIe link training and equalization according to an embodiment has a PCIe Gen 3 rate.

Figure 7:
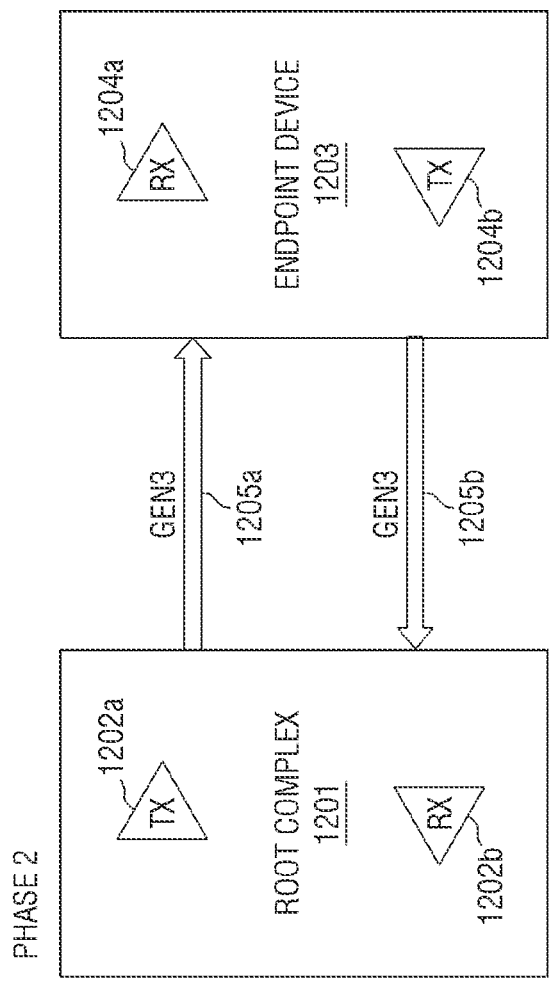
FIG. 7 is a diagram for explaining a phase 2 stage of equalization that operates in the recovery state of FIG. 3.

FIG. 7 is a diagram for explaining a phase 2 stage of equalization that operates in the recovery state of FIG. 3.

Referring to FIGS. 1 and 7, the phase 2 stage of the PCIe link training and equalization is shown.

Two different components, more specifically, a root complex device 1201 and an endpoint device 1203, may be connected by different communication link pairs 1205a and 1205b from each other.

For example, the root complex device 1201 may be a device included in the storage interface circuit 130 of the host device 100 of FIG. 1. Also, the endpoint device 1203 may be a device included in the host interface circuit 211 of the storage device 200 of FIG. 1.

Each of the root complex device 1201 and the endpoint device 1203 includes transmission logic circuits 1202a and 1204b and includes reception logic circuits 1204a and 1202b for communication therebetween.

In an embodiment, the root complex device 1201 includes a downstream port described in the PCIe standard. Additionally, in an embodiment, the endpoint device 1203 includes an upstream port described in the PCIe standard.

At the phase 2 stage of the PCIe link training and equalization, third data sets (e.g., the TS1 ordered sets described in the PCIe standard) may be transmitted from a downstream port (e.g., the root complex device 1201) to an upstream port (e.g., the endpoint device 1203).

At the phase 2 stage of the PCIe link training and equalization, the downstream port (e.g., the root complex device 1201) may adjust the transmission setting values of the upstream port (e.g., the endpoint device 1203) to receive the bit stream that satisfies conditions of all lanes of the communication links between the downstream port (e.g., the root complex device 1201) and the upstream port (e.g., the endpoint device 1203).

The downstream port (e.g., the root complex device 1201) and the upstream port (e.g., the endpoint device 1203) may communicate by PCIe GEN 3.

Figure 8:
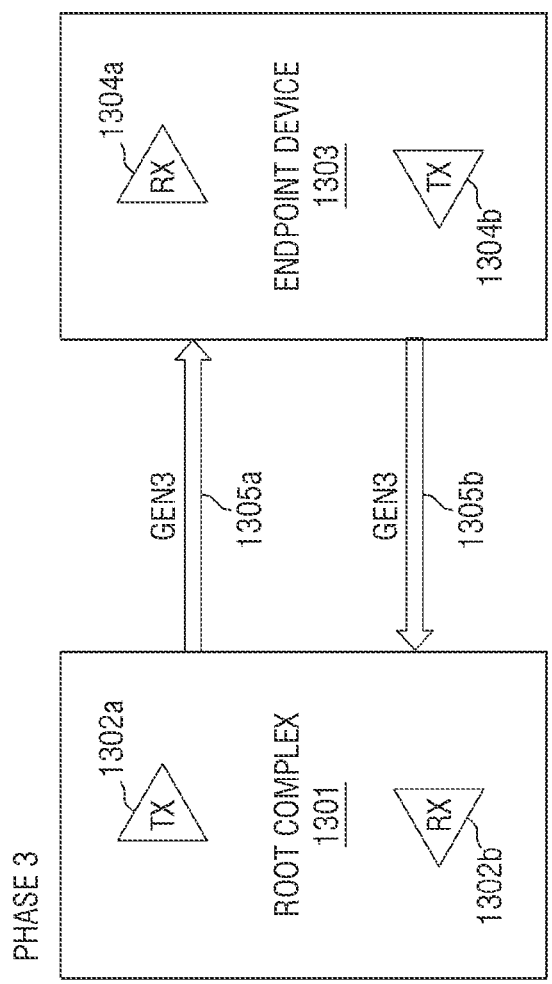
FIG. 8 is a diagram for explaining a phase 3 stage of equalization that operates in the recovery state of FIG. 3.

FIG. 8 is a diagram for explaining phase 3 stage of equalization that operates in the recovery state of FIG. 3.

Referring to FIGS. 1 and 8, a phase 3 stage of the PCIe link training and equalization is shown.

Two different components, more specifically, a root complex device 1301 and an endpoint device 1303, may be connected by different communication link pairs 1305a and 1305b from each other.

For example, the root complex device 1301 may be a device included in the storage interface circuit 130 of the host device 100 of FIG. 1. Also, the endpoint device 1303 may be a device included in the host interface circuit 211 of the storage device 200 of FIG. 1.

Each of the root complex device 1301 and the endpoint device 1303 includes transmission logic circuits 1302a and 1304b and includes reception logic circuits 1304a and 1302b for communication therebetween.

In an embodiment, the root complex device 1301 includes a downstream port described in the PCIe standard. Additionally, in an embodiment, the endpoint device 1303 includes an upstream port described in the PCIe standard.

At the phase 3 stage of the PCIe link training and equalization, fourth data sets (e.g., the TS1 ordered sets described in the PCIe standard) may be transmitted from the downstream port (e.g., the root complex device 1301) to the upstream port (e.g., the endpoint device 1303). At the phase 3 stage of the PCIe link training and equalization, the upstream port (e.g., the endpoint device 1303) may adjust the transmission setting values of the downstream port (e.g., the root complex device 1301) to receive the bit stream that satisfies conditions of all lanes of the communication links between the downstream port (e.g., the root complex device 1301) and the upstream port (e.g., the endpoint device 1303).

The downstream port (e.g., the root complex device 1201) and the upstream port (e.g., the endpoint device 1203) may communicate by PCIe GEN 3.

Hereinafter, the downstream port (e.g., the root complex device 1301) will be described as being the host controller 110 of the host device 100 of FIG. 1, and the upstream port (e.g., the endpoint device 1303) will be described as being the storage controller 210 of the storage device 200 of FIG. 1.

At the phase 3 stage of the PCIe link training and equalization, the host controller 110 may request the storage controller 210 for the first transmission preset value (Tx preset value) or the first coefficient value, for reception signal fine-tuning (Rx signal fine-tuning) of the host controller 110. For example, the host controller 110 may send a message to the storage controller 210 requesting that data be sent from the storage controller 210 to the host controller 110 according to the first transmission preset value or the first coefficient value.

Further, the storage controller 210, which receives the first transmission preset value (Tx preset value) or the first coefficient value requested by the host controller 110, transmits a signal corresponding to the first transmission preset value (Tx preset value) or the first coefficient value requested by the host controller 110 to the host controller 110.

After that, the host controller 110, which receives the signal corresponding to the first transmission preset value (Tx preset value) or the first coefficient value requested by the host controller 110 from the storage controller 210, may request the storage controller 210 for a second transmission preset value (Tx preset value) or a second coefficient value different from the first transmission preset value (Tx preset value) or the first coefficient value. For example, the host controller 110 may send a message to the storage controller 210 requesting that data be sent from the storage controller 210 to the host controller 110 according to the second transmission preset value or the second coefficient value.

Further, the storage controller 210, which receives the second transmission preset value (Tx preset value) or the second coefficient value requested by the host controller 110, transmits a signal corresponding to the second transmission preset value (Tx preset value) or the second coefficient value requested by the host controller 110 to the host controller 110.

By repeating the aforementioned process, the host controller 110 may set the optimum reception signal fine-tuning (Rx signal fine-tuning) value. The host controller 110 transmits the optimum reception signal fine-tuning (Rx signal fine-tuning) value to the storage controller 210, and the optimum reception signal fine-tuning (Rx signal fine-tuning) value transmitted to the storage controller 210 may become a final setting value of the phase 3 stage of the PCIe link training and equalization.

The optimal transmission preset values (Tx preset value) and the coefficient values transmitted and received between the host controller 110 and the storage controller 210 may be stored in the buffer memory 216 or the non-volatile memory device 220 of the storage device 200 of FIG. 1. The optimum transmission preset values (Tx preset values) and the coefficient values transmitted and received between the host controller 110 and the storage controller 210 may be accumulated as shown of FIG. 9 to create a database or a table.

FIG. 9 is a diagram showing a database accessed by the link manager 215 of the storage system 10 of FIG. 1 according to an embodiment.

Referring to FIGS. 1 and 9, a database in which the optimal transmission preset values (Tx preset values) and the coefficient values transmitted and received between the host controller 110 and the storage controller 210 are accumulated is shown.

The database may be stored in the buffer memory 216 or may be stored in the non-volatile memory device 220.

Rx may be recorded in the database, as a path for the reception signal fine-tuning (Rx signal fine-tuning).

There may be a plurality of ports through which the storage device 200 is connected to the host device 100 in the storage system 10. In this drawing, it is assumed that the storage device 200 is connected to the host device 100 through 5 ports.

A plurality of lanes may be connected between the host device 100 and the storage device 200 as shown in FIG. 4.

The number according to the lane through which the transmission preset values (Tx preset value) and the coefficient values transmitted and received between the host controller 110 and the storage controller 210 are delivered may be recorded.

In this drawing, it is assumed that a total of four lanes 0 to 3 are connected between the host device 100 and the storage device 200.

The speed of PCIe Gen3 is assumed to be set at the phase 3 stage of the PCIe link training and equalization.

HIGH is a maximum voltage margin that is set for transmission and reception of data between the host device 100 and the storage device 200, and LOW is a minimum voltage margin that is set for transmission and reception of data between the host device 100 and the storage device 200. The units of HIGH and LOW may be in millivolts (Mv).

The larger the absolute values of HIGH and LOW are, the larger the voltage margin are. Accordingly, the communication efficiency between the host controller 110 and the storage controller 210 may increase.

RIGHT is a time margin required for transmission and reception of data between the host device 100 and the storage device 200, and the unit thereof may be picosecond (ps).

The larger the value of RIGHT is, the larger the time margin is. Accordingly, the communication efficiency between the host controller 110 and the storage controller 210 may increase.

The transmission preset values (Tx preset value) and the coefficient values transmitted and received between the host controller 110 and the storage controller 210 at the phase 3 stage of the PCIe link training and equalization may each be recorded as a precursor (PH3_PRECURSOR) and a postcursor (PH3_POSTCURSOR).

As the number of booting repetitions of the storage device 200 increases, the reliability of the optimal transmission preset values (Tx preset value) and the coefficient values transmitted to the storage controller 210 by the host controller 110 may decrease.

For example, when the host controller 110 transmits the pre-cursor "3" and the post-cursor "4" as the optimal transmission preset values (Tx preset value) and the coefficient values to the storage controller 210 on the lane 0 of 5 ports, it is possible to understand that values (78, 81) of HIGH are significantly lower than other values (101, 103, 99) of HIGH of the same lane of the same port.

More specifically, when the user of the storage device 200 sets the reliable value of HIGH to 83 or more, if the host controller 110 transmits the pre-cursor "3" and post-cursor "4" as the optimum transmission preset values (Tx preset value) and the coefficient values to the storage controller 210 on 0 lane of 5 ports, it may be determined that the phase 3 stage of the PCIe link training and equalization is unreliable.

Also, for example, when the host controller 110 transmits the pre-cursor "3" and the post-cursor "4" as the optimal transmission preset values (Tx preset value) and the coefficient values to the storage controller 210 on lane 0 of 5 ports, it may be understood that the absolute values (79, 82) of LOW are significantly lower than other absolute value 106 of LOW of the same lane of the same port.

More specifically, when the user of the storage device 200 sets the reliable absolute value of LOW to 83 or more, if the host controller 110 transmits the pre-cursor "3" and post-cursor "4" as the optimum transmission preset values (Tx preset value) and the coefficient values to the storage controller 210 on 0 lane of 5 ports, it may be determined that the phase 3 stage of the PCIe link training and equalization is unreliable.

For example, when the host controller 110 transmits the pre-cursor "3" and the post-cursor "4" as the optimal transmission preset values (Tx preset value) and the coefficient values to the storage controller 210 on lane 0 of 5 ports, it may be understood that the absolute values (50, 56) of RIGHT are significantly lower than other absolute values (79, 81, 77) of RIGHT on the same lane of the same port.

More specifically, when the user of the storage device 200 sets the reliable absolute value of RIGHT to 57 or more, if the host controller 110 transmits the pre-cursor "3" and post-cursor "4" as the optimum transmission preset values (Tx preset value) and the coefficient values to the storage controller 210 on 0 lane of 5 ports, it may be determined that the phase 3 stage of the PCIe link training and equalization is unreliable.

In this way, due to repeated booting of the storage device 200, at the phase 3 stage of the PCIe link training and equalization, there may be a case where the host controller 110 requests the storage controller 210 for the unreliable optimal transmission preset value (Tx preset value) and coefficient values. For example, there may be a case where the host controller 110 requests that the storage controller 210 use an unreliable optimal transmission preset value (Tx preset value) and an unreliable coefficient value.

Therefore, the storage device 200 according to an embodiment determines a case where the host controller 110 requests the storage controller 210 for unreliable optimal transmission preset values (Tx preset value) and the coefficient values through the link manager 215 in the storage controller 210, at the phase 3 stage of the PCIe link training and equalization, and transmits a signal according to other optimal transmission preset values (Tx preset value) and coefficient values to the host controller 110.

Accordingly, it is possible to increase the reliability of the phase 3 stage of the PCIe link training and equalization between the storage device 200 including the storage controller 210 according to an embodiment and the host device 100.

The configuration and operation of the link manager 215 of the storage controller 210 according to an embodiments will be described in detail with reference to FIGS. 10 to 16 below.

Figure 10:
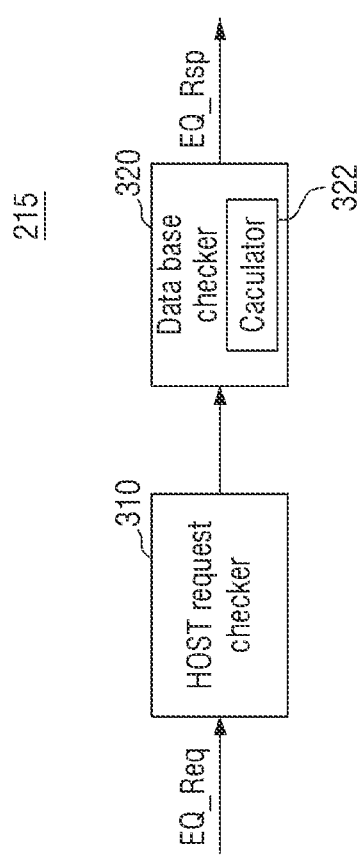
FIG. 10 is a block diagram for explaining the link manager 215 of the storage system 10 of FIG. 1 according to an embodiment.
Figure 11:
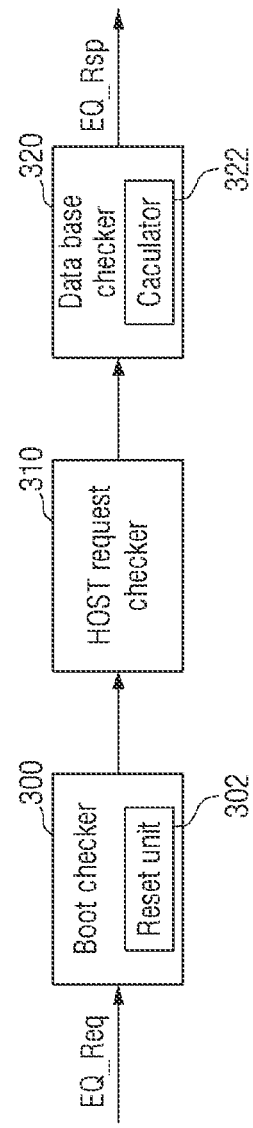
FIGS. 11 to 14 are other block diagrams for explaining the link manager 215 of the storage system 10 of FIG. 1 according to an embodiment.
Figure 12:
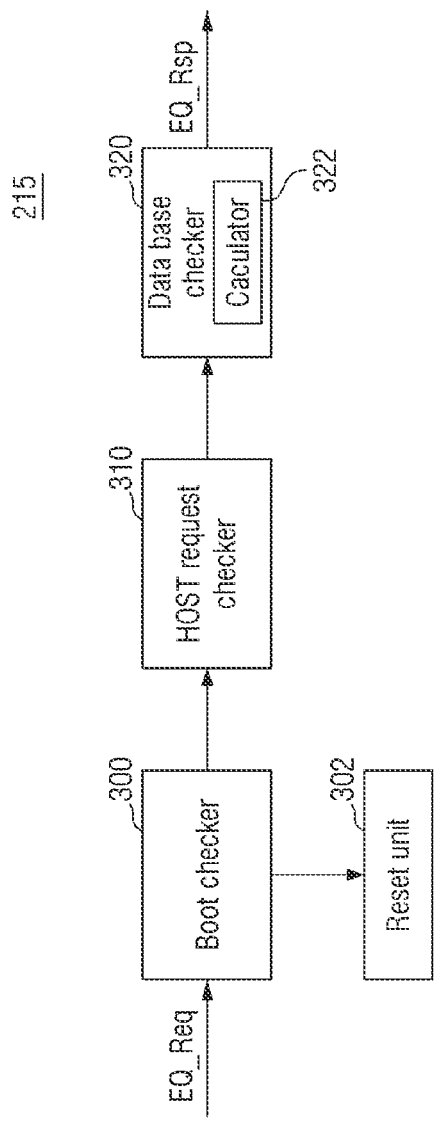
Figure 13:
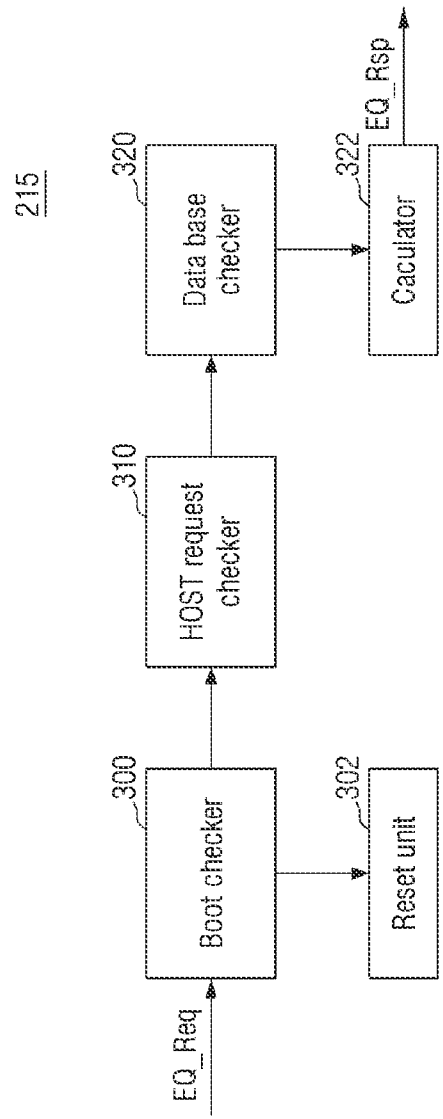
Figure 14:
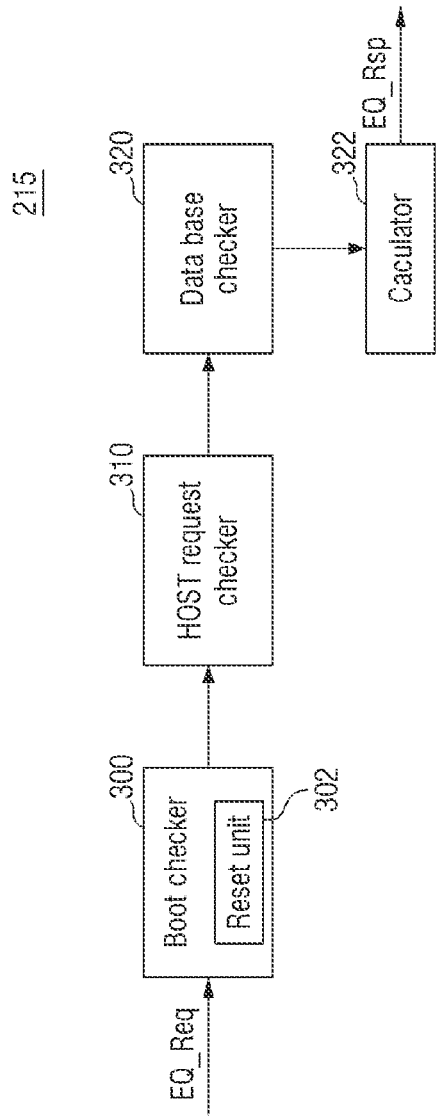

FIG. 10 is a block diagram for explaining the link manager 215 of the storage system 10 of FIG. 1 according to an embodiment.

Referring to FIG. 10, the link manager 215 includes a host request checker 310 (e.g., a logic circuit) and a database checker 320 (e.g., a logic circuit).

The host request checker 310 may receive the first transmission preset value (Tx preset value and first coefficient value) from the host device 100, at the phase 3 stage of the PCIe link training and equalization.

The host request checker 310 may deliver the first transmission preset value (Tx preset value) and the first coefficient value of the phase 3 stage received from the host device 100 at the first time point to the database checker 320.

The database checker 320 may refer to the database described through FIG. 9 to check whether the first transmission preset value (Tx preset value) and the first coefficient value are values which are optimized for the phase 3 stage of the PCIe link training and equalization.

At this time, when the database checker 320 determines that the first transmission preset value and the first coefficient value are values which are optimized for phase 3 stage of the PCIe link training and equalization, the database checker 320 may transmit a signal corresponding to the first transmission preset value and the first coefficient value to the host device 100.

If the database checker 320 determines that the first transmission preset value and the first coefficient value are not values optimized for the phase 3 stage of the PCIe link training and equalization, the database checker 320 transmits a signal corresponding to a second transmission preset value and a second coefficient value, which are different from the first transmission preset and the first coefficient value and optimized for the phase 3 stage of the PCIe link training and equalization, to the storage device.

The database checker 320 may include a calculator 322 to determine whether the first transmission preset value and the first coefficient value are values optimized for phase 3 stage of the PCIe link training and equalization.

For reference, the host request checker 310, the database checker 320, and/or the calculator 322 may be implemented as physically independent and separate chips, without being limited to this diagram. Further, the host request checker 310, the database checker 320, and/or the calculator 322 may be implemented inside the same package without being limited thereto.

The calculator 322 may refer to the database of FIG. 9. At this time, information until the first time point, at which the host request checker 310 receives the first transmission preset value (Tx preset value) and the first coefficient value of phase 3 stage from the host device 100, may be recorded in the database of FIG. 9.

As an example, it is assumed as a signal received through the fifth port and the fourth lane to which the first transmission preset value and the first coefficient value are transmitted.

The calculator 322 refers to the transmission preset values (e.g., PH3_PRECURSOR) and the coefficient values (e.g., PH3_POSTCURSOR) recorded as signals received through the fifth port and fourth lane.

At this time, the calculator 322 checks that a case where, among the transmission preset values (e.g., PH3_PRECURSOR) and the coefficient values (e.g., PH3_POSTCURSOR) recorded as the signal received through the fifth port and the fourth lane, the transmission preset value (e.g., PH3_PRECURSOR) is "1" and the coefficient value (e.g., PH3_POSTCURSOR) is "0" is recorded at the maximum number of times on the fifth port and the fourth lane, and determines the transmission preset value (e.g., PH3_PRECURSOR) of "1" and the coefficient value (e.g., PH3_POSTCURSOR) of "0" as the optimum request signal.

That is, the database checker 320, more specifically, the calculator 322 checks whether the first transmission preset value (Tx preset value) and the first coefficient value of the phase 3 state received from the host device 100 by the host request checker 310 are "1" and "0", respectively.

If the first transmission preset value (Tx preset value) and the first coefficient value of the phase 3 state received from the host device 100 by the host request checker 310 are each "1" and "0", the database checker 320, more specifically, the calculator 322 determines that they are values optimized for phase 3 stage of the PCIe link training and equalization, and may transmit the signal EQ_Rsp corresponding to the first transmission preset value and the first coefficient value to the host device 100.

Alternatively, if the first transmission preset value (Tx preset value) and the first coefficient value of phase 3 state received from the host device 100 by the host request checker 310 are not "1" and "0", the database checker 320, more specifically, the calculator 322 determines that they are not values optimized for phase 3 stage of the PCIe link training and equalization, and may transmit a signal EQ_Rsp, in which the second transmission preset value (Tx preset value) and the second coefficient value each correspond to "1" and "0", to the host device 100.

FIGS. 11 to 14 are other block diagrams for explaining the link manager 215 of the storage system 10 of FIG. 1 according to an embodiment.

Referring to FIGS. 11 to 14, the link manager 215 may further include a booting checker 300 (e.g., a logic circuit).

The booting checker 300 may also include a reset unit 302 (e.g., a logic circuit).

The booting checker 300, the reset unit 302, the host request checker 310, the database checker 320, and the calculator 322 are not limited to this drawings, and may be implemented as physically independent and separate chips. Moreover, the booting checker 300, the reset unit 302, the host request checker 310, the database checker 320, and the calculator 322 may be implemented inside the same package, without being limited thereto.

The booting checker 300 may determine a booting type prior to the first time point at which the host request checker 310 receives the first transmission preset value and the first coefficient value at the phase 3 stage of the PCIe link training and equalization from the host device 100.

This will be described together with FIG. 15.

Figure 15:
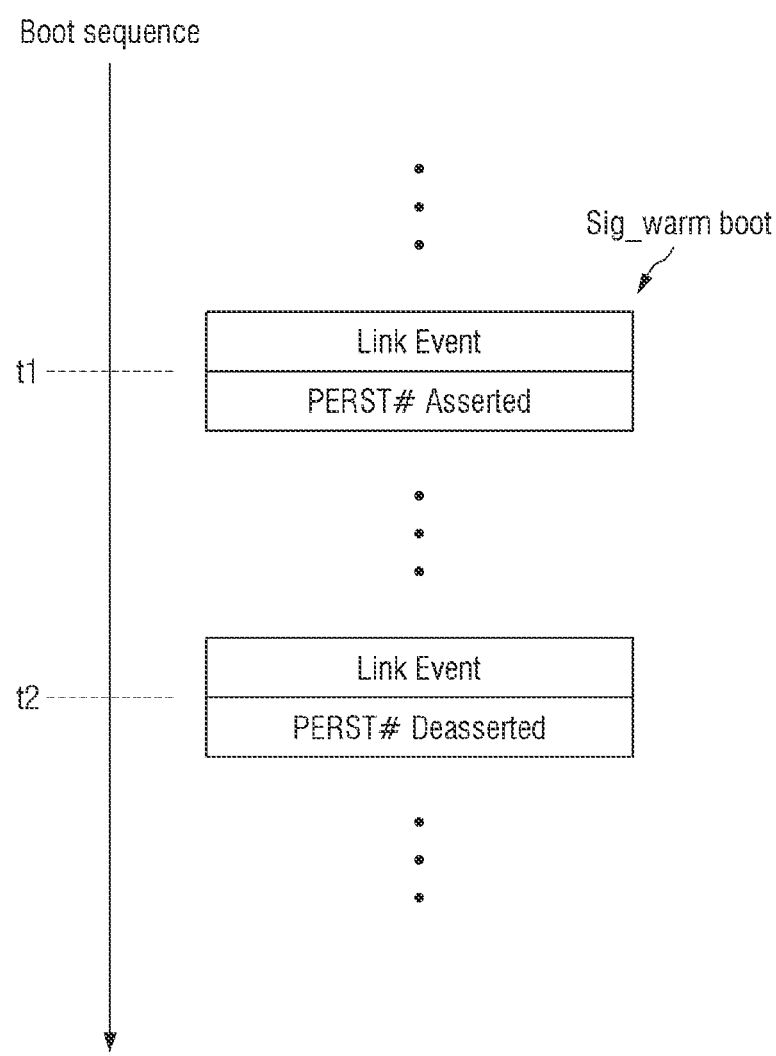
FIG. 15 is a diagram for explaining signals received through a Peripheral Component Interconnect Express (PCIe) bus after the storage device 200 of FIG. 1 is booted according to an embodiment.

FIG. 15 is a diagram for explaining the signals received through a PCIe (Peripheral Component Interconnect Express) bus after the storage device 200 of FIG. 1 according to an embodiment is booted.

Referring to FIGS. 11 to 15, after the booting checker 300 is booted prior to the first time point at which the host request checker 310 receives the first transmission preset value and the first coefficient value from the host device 100 at the phase 3 stage of the PCIe link training and equalization, the booting checker 300 may check the signal according to the booting sequence received by the storage device 200 from the host device 100.

For example, the booting checker 300 checks the signals according to the booting sequence received by the storage device 200 from the host device 100 after the storage device 200 is booted prior to the first time point.

At this time, it is confirmed whether a PERST #Asserted signal of a link event is received within a defined time (for example, 1 sec) before a second time point t2 at which a PERST #Deasserted signal of the link event is received, after the booting prior to the first time point is started.

For example, when it is confirmed that PERST #Asserted signal for the link event is received at a first time point t1 within a defined time (e.g., 1 second) before the second time point t2 at which a PERST #Deasserted signal for the link event is received, the booting checker 300 may generate a signal (Sig_warm boot) that determines the booting type as warm boot.

If it is not confirmed that PERST #Asserted signal for the link event is received at the first time point t1 within a defined time (e.g., 1 second) before the second time point t2 at which the PERST #Deasserted signal for the link event is received, after the booting prior to the first time point is started, the booting checker 300 may determine the booting type as a cold boot.

For example, in the case of the cold boot, there is no PERST #Asserted signal for the link event, and only the PERST #Deasserted signal may exist.

The cold boot may be, for example, a booting type that occurs while being installed in the other second slot after the storage device 200 is installed in the first slot among the plurality of slots connected to the host device 100.

The reset unit 302 may reset the database when it is determined that the booting type of the storage device 200 is a cold boot. For example, a reset of the database may cause all entries of the database to be deleted.

Because the environment in which the storage device 200 is assembled with the host device 100 has changed, it is difficult to confirm whether the first transmission preset value and the first coefficient value received by the storage device 200 from the host device 100 at the phase 3 stage of the PCIe link training and equalization are the optimized values through the database. Accordingly, the database is initialized.

When the booting type of the storage device 200 is determined to be a warm boot, the operation of the link manager 215 described in FIG. 10 proceeds.

Figure 16:
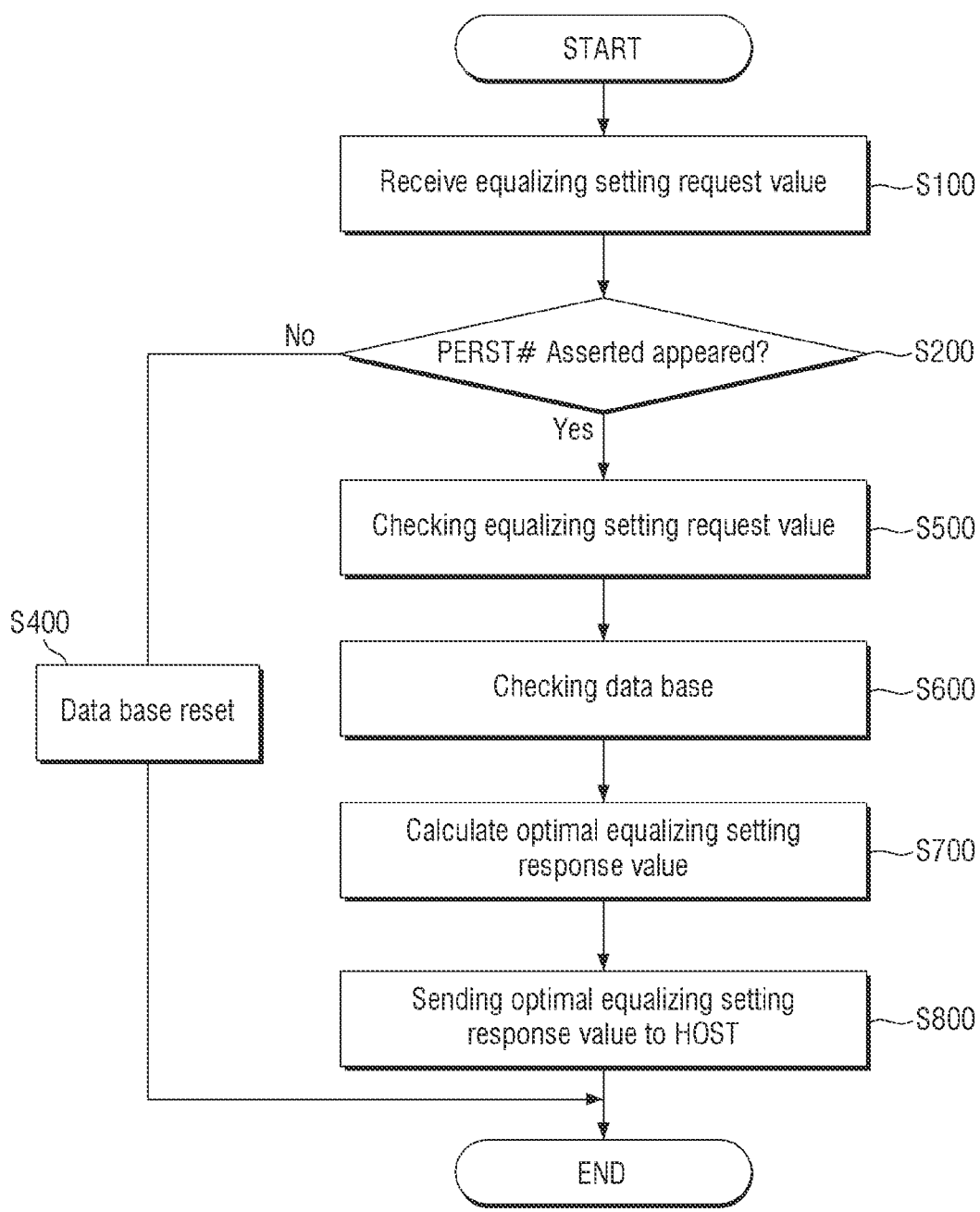
FIG. 16 is a flow chart for explaining a method of operating a storage device according to an embodiment.

FIG. 16 is a flow chart for explaining a method of operating a storage device according to an embodiment.

Referring to FIGS. 1, and 10 to 16, the host request checker 310 may receive the first transmission preset value (Tx preset value) and the first coefficient of the phase 3 stage from the host device 100 at a first time point, at the phase 3 stage of the PCIe link training and equalization (S100). For example, the host request checker 310 may receive an equalizing setting request value at step S100.

After that, the booting checker 300 checks the signal according to the booting sequence received by the storage device 200 from the host device 100 after the storage device 200 was booted prior to the first time point, and confirms whether to receive the PERST #Asserted signal for the link event has been received within a defined time (for example, 1 second), before the time of receiving the PERST #Deasserted signal for the link event (S200).

If the booting checker 300 fails to check the PERST #Asserted signal (N), the booting checker 300 may determine the booting type as a cold boot and reset the database through the reset unit 302 (S400). For example, if the PERST #Asserted signal is not received within the defined time, the method proceeds to step S400.

Otherwise, if the booting checker 300 checks the PERST #Asserted signal (Y), the database checker 320 determines whether the first transmission preset value (Tx preset value) and the first coefficient value are the values optimized for the phase 3 stage of PCIe link training and equalization (S500). For example, if the PERST #Asserted signal is received within the defined time, the method proceeds to step S500.

At this time, the database checker 320 may refer to the database described through FIG. 9 to determine whether the first transmission preset value (Tx preset value) and the first coefficient value are values optimized for the phase 3 stage of the PCIe link training and equalization (S600).

After that, the database checker 320 may determine, through the calculator 322, whether the first transmission preset value and the first coefficient value are values optimized for the phase 3 stage of the PCIe link training and equalization (S700). For example, if the first transmission preset value and the first coefficient value are values not optimized for the phase 3 stage of the PCIe link training and equalization, an optimal transmission preset value and an optimal coefficient value may be determined.

After that, the database checker 320, and more particularly, the calculator 322, transmits the signal corresponding to the transmission preset value and coefficient value optimized for the phase 3 stage of the PCIe link training and equalization to the host device 100 (S800).

Figure 17:
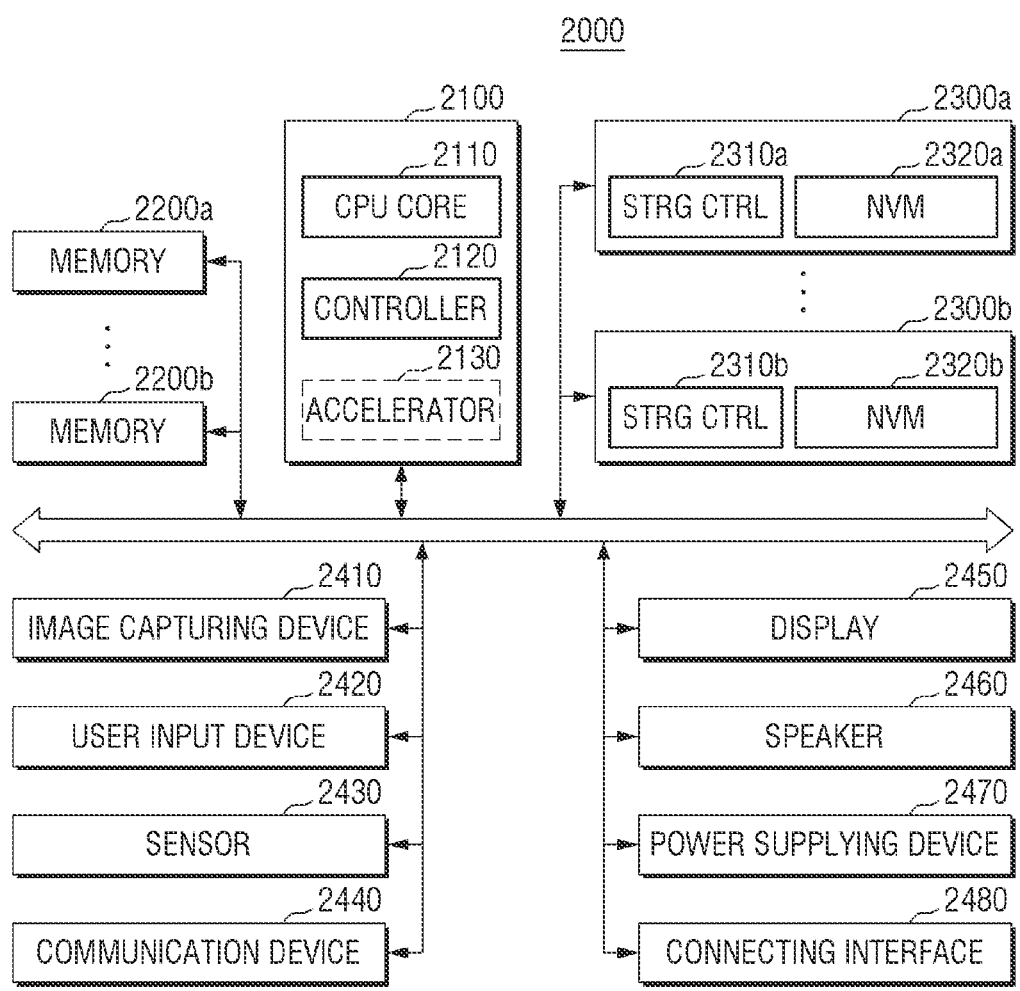
FIG. 17 is a block diagram for explaining a system to which the storage device according to an embodiment is applied.

FIG. 17 is a block diagram for explaining a system to which the storage device is applied according to an embodiment.

Referring to FIG. 17, a system 2000 may be basically a mobile system, such as a mobile phone, a smart phone, a tablet PC (tablet personal computer), a wearable device, a healthcare device or an IOT (internet of things) device.

However, the system 2000 of FIG. 1 is not necessarily limited to the mobile system, but may also be a personal computer, a laptop computer, a server, a media player or an automotive device such as navigation.

Referring to FIG. 17, the system 2000 may include a main processor 2100, memories 2200a and 2200b, and storage devices 2300a and 2300b, and may additionally include one or more of an image capturing device 2410, a user input device 2420, a sensor 2430, a communication device 2440, a display 2450, a speaker 2460, a power supplying device 2470, and a connecting interface 2480.

The main processor 2100 may control the overall operations of the system 2000, more specifically, the operations of other constituent elements that make up the system 2000. Such a main processor 2100 may be implemented as a general-purpose processor, a dedicated processor, an application processor, or the like.

The main processor 2100 may include one or more CPU cores 2110, and may further include a controller 1120 for controlling the memories 2200a and 2200b and/or the storage devices 2300a and 2300b. Depending on the embodiments, the main processor 2100 may further include an accelerator 2130, which is a dedicated circuit for a high-speed data computation such as an AI (artificial intelligence) data computation. Such an accelerator 2130 may include a GPU (Graphics Processing Unit), an NPU (Neural Processing Unit) and/or a DPU (Data Processing Unit), and the like, and may be implemented as separate chips that are physically independent of other constituent elements of the main processor 2100.

The memories 2200a and 2200b may be used as a main memory unit of the system 2000, and may include a volatile memory such as an SRAM and/or a DRAM, but may also include a non-volatile memory such as a flash memory, a PRAM and/or a RRAM. The memories 2200a and 2200b may also be implemented inside the same package as the main processor 2100.

The storage devices 2300a and 2300b may function as non-volatile storage devices that store data regardless of whether a power is supplied, and may have a relatively larger storage capacity than the memories 2200a and 2200b. The storage devices 2300a and 2300b may include storage controllers 2310a and 2310b, and non-volatile memories (NVM) 2320a and 2320b that store data under the control of the storage controllers 2310a and 2310b. The non-volatile memories 2320a and 2320b may include a flash memory of a 2D (2-dimensional) structure or a 3D (3-dimensional) V-NAND (Vertical NAND) structure, but may also include other types of non-volatile memories such as a PRAM and/or a RRAM.

The storage devices 2300a and 2300b may be included in the system 2000 in the state of being physically separated from the main processor 2100, and may be implemented in the same package as the main processor 2100. Further, since the storage devices 2300a and 2300b have a shape such as a solid state device (SSD) or a memory card, the storage devices 2300a and 2300b may also be detachably coupled with other constituent elements of the system 2000 through an interface such as a connecting interface 2480 to be described below. Such storage devices 2300a and 2300b may be, but are not necessarily limited to, devices to which standard protocols such as a universal flash storage (UFS), an embedded multi-media card (eMMC) or a non-volatile memory express (NVMe).

The storage devices 2300a and 2300b may include the link manager 215 described above through FIGS. 1 to 16.

The image capturing device 2410 may capture still images or moving images, and may be a camera, a camcorder, and/or a webcam and the like.

The user input device 2420 may receive various types of data that are input from users of the system 2000, and may be a touch pad, a key pad, a key board, a mouse and/or a microphone.

The sensor 2430 may detect various types of physical quantities that may be acquired from the outside of the system 2000, and convert the detected physical quantities into electrical signals. Such a sensor 2430 may be a temperature sensor, a pressure sensor, an illuminance sensor, a position sensor, an acceleration sensor, a biosensor and/or a gyroscope sensor.

The communication device 2440 may transmit and receive signals to and from other devices outside the system 2000 according to various communication protocols. Such a communication device 2440 may be implemented to include an antenna, a transceiver and/or a modem and the like.

The display 2450 and the speaker 2460 may each function as output devices that output visual and auditory information to the user of the system 2000.

The power supplying device 2470 may appropriately convert the power supplied from a battery (not shown) equipped in the system 2000 and/or an external power supply and supply the power to each constituent element of the system 2000.

Figure 18:
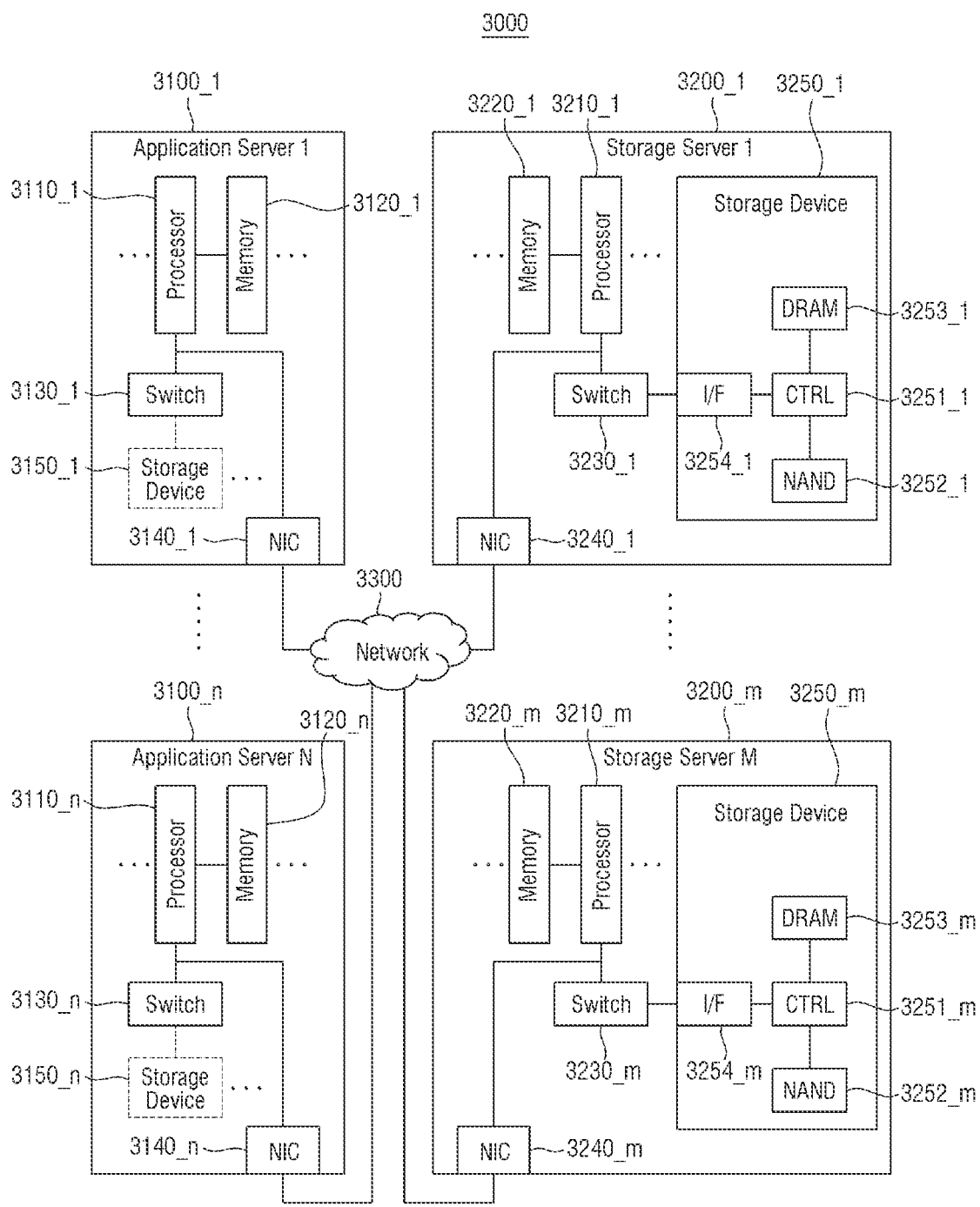
FIG. 18 is a block diagram for explaining a data center to which the storage device is applied according to an embodiment.

The connecting interface 2480 may provide a connection between the system 2000 and an external device that may be connected to the system 2000 to transmit and receive data to and from the system 2000. The connecting interface 2480 may be implemented in various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCIe (PCI express), a NVMe, an IEEE 1394, a universal serial bus (USB), a secure digital (SD) card, a multi-media card (MMC), an eMMC, a UFS, an embedded Universal Flash Storage (eUFS), and a compact flash (CF) card interface. FIG. 18 is a block diagram for explaining a data center to which the storage device according to some embodiments is applied.

Referring to FIG. 18, a data center 3000 is a facility that gathers various types of data and provides services, and may also be called a data storage center. The data center 3000 may be a system for search engine and database operation, and may be a computing system used by corporations such as banks or government agencies. The data center 3000 may include application servers 3100_1 to 3100_n and storage servers 3200_1 to 3200_m. The number of application servers 3100_1 to 3100_n and the number of storage servers 3200_1 to 3200_m may be variously selected depending on the embodiments, and the number of application servers 3100_1 to 3100_n and the number of storage servers 3200_1 to 3200_m may be different from each other.

The application server 3100_1 or the storage server 3200_1 may include at least one of processors 3110 and 3210 and memories 3120 and 3220. The storage server 3200_1 will be described as an example. The processor 3210_1 may control the overall operation of the storage server 3200_1, and access the memory 3220 to execute command and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM or a Non- Volatile DIMM (NVMDIMM). According to the embodiment, the number of processors 3210_1 and the number of memories 3220 included in the storage server 3200_1 may be variously selected. In an embodiment, the processor 3210_1 and the memory 3220 may provide a processor-memory pair. In an embodiment, the number of processors 3210_1 and memories 3220 may be different from each other. The processor 3210_1 may include a single core processor or a multi-core processor. The aforementioned explanation of the storage server 3200_1 may also be similarly applied to the application server 3100_1. According to the embodiment, the application server 3100_1 may not include a storage device 3150. The storage server 3200_1 may include at least one or more storage devices 3250_1. The number of storage devices 3250_1 included in the storage server 3200_1 may be variously selected depending on the embodiment.

At least one or more storage devices 3250_1 may be storage devices including the link manager 215 described above through FIGS. 1 to 16.

The storage server 3200_1 will be described as an example. The interface 3254_1 may provide a physical connection between the processor 3210_1 and the controller 3251_1, and a physical connection between the Network Interconnect (NIC) 3240_1 and the controller 3251_1. For example, the interface 3254_1 may be implemented in a Direct Attached Storage (DAS) type in which the storage device 3250_1 is directly connected with a dedicated cable. Also, for example, the interface 3254_1 may be implemented in various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCIe (PCI express), a NVM express (NVMe), an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and/or a compact flash (CF) card interface.

The storage server 3200_1 may further include a switch 3230_1 and a NIC 3240_1. The switch 3230_1 may selectively connect the processor 3210_1 and the storage device 3250_1 or may selectively connect the NIC 3240_1 and the storage device 3250_1, according to the control of the processor 3210_1.

In an embodiment, the NIC 3240_1 may include a network interface card, a network adapter, and the like. The NIC 3240_1 may be connected to the network 3300 by a wired interface, a wireless interface, a Bluetooth interface, an optical interface, or the like. The NIC 3240_1 may include an internal memory, a Digital Signal Processor (DSP), a host bus interface, or the like, and may be connected to the processor 3210_1 and/or the switch 3230_1, or the like through the host bus interface. The host bus interface may also be implemented as one of the examples of the interface 3254_1 described above. In an embodiment, the NIC 3240_1 may also be integrated with at least one of the processor 3210_1, the switch 3230_1, and the storage device 3250_1.

In the storage servers 3200_1 to 3200_m or the application servers 3100_1 to 3100_n, the processor may transmit the commands to the storage devices 3150_1 to 3150_n and 3250_1 to 3250_m or the memories 3120_1 to 3120_n and 3220_1 to 3220_m to program or read the data. At this time, the data may be data in which an error is corrected through an ECC (Error Correction Code) engine. The data is data subjected to data bus inversion (DBI) or data masking (DM) process, and may include Cyclic Redundancy Code (CRC) information. The data may be data that is encrypted for security and privacy.

The storage devices 3150_1 to 3150_m and 3250_1 to 3250_m may transmit the control signal and command/address signal to the NAND flash memory devices 3252_1 to 3252_m in response to the read command received from the processor. Accordingly, when data is read from the NAND flash memory devices 3252_1 to 3252_m, the Read Enable (RE) signal is input as a data output control signal, and may serve to output the data to the DQ bus. A Data Strobe (DQS) may be generated, using the RE signal. Commands and address signals may be latched to the page buffer, depending on a rising edge or a falling edge of a Write Enable (WE) signal.

The controller 3251_1 may generally control the operation of the storage device 3250_1. In an embodiment, the controller 3251_1 may include a Static Random Access Memory (SRAM). The controller 3251_1 may write data in the NAND flash 3252_1 in response to a write command, or may read the data from the NAND flash 3252_1 in response to a read command. For example, the write command and/or the read command may be provided from the processor 3210_1 in the storage server 3200_1, a processor 3210_m in another storage server 3200_m or the processors 3110_1 and 3110_n in the application servers 3100_1 and 3100_n. A DRAM 3253_1 may temporarily store (buffer) the data to be written in the NAND flash 3252_1 or the data read from the NAND flash 3252_1. Also, the DRAM 3253_1 may store metadata. Here, the metadata is a user data or data generated by the controller 3251_1 to manage the NAND flash 3252_1. The storage device 3250_1 may include a Secure Element (SE) for security and privacy.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A storage controller comprising:
 a link manager comprising:
 a first logic circuit that receives a first transmission preset value and a first coefficient value associated with a first port at from a host, at a phase 3 stage of a Peripheral Component Interconnect Express (PCIe) link training and equalization; and
 a second logic circuit that determines the first transmission preset value and the first coefficient value are optimal for the phase 3 stage of the PCIe link training and equalization when the first transmission preset value and the first coefficient value are present as a pair in a database and the pair has been recorded a maximum number of times for the first port,
 wherein when the first transmission preset value and the first coefficient value are determined to be optimal for the phase 3 stage of the PCIe link training and equalization, the second logic circuit transmits a signal including the first transmission preset value and the first coefficient value to the host, and
 when the first transmission preset value and the first coefficient value are determined not to be optimal for the phase 3 stage of the PCIe link training and equalization, the second logic circuit transmits a signal including a second transmission preset value and a second coefficient value, which are different from the first transmission preset value and the first coefficient value, to the host.

2. The storage controller of claim 1, further comprising: a buffer memory, wherein the database is stored in the buffer memory.

3. The storage controller of claim 2, wherein the buffer memory is a volatile memory.

4. The storage controller of claim 1, wherein the second logic circuit further includes a calculator, with reference to the database, for the first port and a first lane to which the first transmission preset value and the first coefficient value are transmitted, the calculator checks transmission preset values and coefficient values recorded for the first port and the first lane, and the calculator sets the transmission preset value and the coefficient value recorded the maximum number of times for the first port and the first lane to the second transmission preset value and the second coefficient value.

5. The storage controller of claim 1, wherein the link manager further includes a third logic circuit that determines a booting type prior to a first time during which the first logic circuit receives the first transmission preset value and the first coefficient value.

6. The storage controller of claim 5, wherein the third logic circuit determines the booting type to be a warm boot, when a PERST #Asserted signal is received prior to a defined time, from a time at which a PERST #Deasserted signal is received from the host, after booting prior to the first time, and the third logic circuit determines the booting type to be a cold boot, when the PERST-#Asserted signal is not received from the host prior to the defined time, from the time at which the PERST-#Deasserted signal is received, after booting prior to the first time.

7. The storage controller of claim 6, wherein the third logic circuit resets the database when the cold boot occurs.

8. A storage device comprising:
a storage controller, wherein the storage controller includes a link manager comprising:
a first logic circuit which receives a first transmission preset value and a first coefficient value associated with a first port from a host, at a phase 3 stage of a Peripheral Component Interconnect Express (PCIe) link training and equalization; and
a second logic circuit which determines the first transmission preset value and the first coefficient value are optimal for the phase 3 stage of the PCIe link training and equalization when the first transmission preset value and the first coefficient value are present as a pair in database and the pair has been recorded a maximum number of times for the first port,
wherein when the first transmission preset value and the first coefficient value are determined to be optimal for the phase 3 stage of the PCIe link training and equalization, the second logic circuit transmits a signal including the first transmission preset value and the first coefficient value to the host, and
when the first transmission preset value and the first coefficient value are determined not to optimal for the phase 3 stage of the PCIe link training and equalization, the second logic circuit transmits a signal including a second transmission preset value and a second coefficient value, which are different from the first transmission preset value and the first coefficient value, to the host.

9. The storage device of claim 8, wherein the storage controller further includes a buffer memory and the database is stored in the buffer memory.

10. The storage device of claim 9, wherein the buffer memory is a volatile memory.

11. The storage device of claim 8, wherein the second logic circuit further includes a calculator, with reference to the database, for the first port and a first lane to which the first transmission preset value and the first coefficient value are transmitted, the calculator checks transmission preset values and coefficient values recorded for the first port and the first lane, and the calculator sets the transmission preset value and the coefficient value recorded the maximum number of times for the first port and the first lane to the second transmission preset value and the second coefficient value.

12. The storage device of claim 8, wherein the link manager further includes a third logic circuit that determines a booting type prior to a first time during which the first logic circuit receives the first transmission preset value and the first coefficient value.

13. The storage device of claim 12, wherein the third logic circuit determines the booting type to be a warm boot, when a PERST #Asserted signal is received prior to a defined time, from a time at which a PERST #Deasserted signal is received from the host, after booting prior to the first time, and the third logic circuit determines the booting type to be a cold boot, when the PERST_Asserted signal is not received from the outside prior to the defined time, from the time at which the PERST_Deasserted signal is received, after booting prior to the first time.

14. The storage device of claim 13, wherein the third logic circuit resets the database when the cold boot occurs.

15. The storage device of claim 8, further comprising: a non-volatile memory device, wherein the database is stored in the non-volatile memory device.

16. A storage system comprising:
a host device; and
a storage device which receives a first transmission preset value and a first coefficient value associated with a first port from the host device at a phase 3 stage of a PCIe link training and equalization, wherein the storage device includes a storage controller, the storage controller includes a link manager comprising:
a first logic circuit; and
a second logic circuit which determines the first transmission preset value and the first coefficient value are optimal for the phase 3 stage of the PCIe link training and equalization when the first transmission preset value and the first coefficient value are present as a pair in a database and the pair has been recorded a maximum number of times for the first port,
wherein when the first transmission preset value and the first coefficient value are determined to optimal for the phase 3 stage of the PCIe link training and equalization, the second logic circuit transmits a signal including the first transmission preset value and the first coefficient value to the host device, and
when the first transmission preset value and the first coefficient value are determined not to be optimal for the phase 3 stage of the PCIe link training and equalization, the second logic circuit transmits a signal including a second transmission preset value and a second coefficient value, which are different from the first transmission preset value and the first coefficient value, to the host device.

17. The storage system of claim 16, wherein the second logic circuit further includes a calculator, with reference to the database, for the first port and a first lane to which the first transmission preset value and the first coefficient value are transmitted, the calculator checks transmission preset values and coefficient values recorded for the first port and the first lane, and the calculator sets the transmission preset value and the coefficient value recorded the maximum number of times through the first port and the first lane to the second transmission preset value and the second coefficient value.

18. The storage system of claim 16, wherein the link manager further includes a third logic circuit that determines a booting type prior to a first time during which the storage device receives the first transmission preset value and the first coefficient value.

19. The storage system of claim 18, wherein the third logic circuit determines the booting type to be a warm boot, when a PERST #Asserted signal is received prior to a defined time, from a time at which a PERST #Deasserted signal is received from the host device, after booting prior to the first time, and the third logic circuit determines the booting type to be a cold boot, when the PERST-#Asserted signal is not received from the host device prior to the defined time, from the time at which the PERST-#Deasserted signal is received, after booting prior to the first time.

20. The storage system of claim 19, wherein the third logic circuit resets the database when the cold boot occurs.

\* \* \* \* \*